United States Patent [19]

Shimada et al.

[11] Patent Number: 5,056,116
[45] Date of Patent: Oct. 8, 1991

[54] DATA DEMODULATION APPARATUS

[75] Inventors: Toshiyuki Shimada; Kazuhiro Aoki, both of Osaka; Akira Kurahashi, Kyoto; Noboru Kikuchi, Osaka, all of Japan

[73] Assignee: Matsushita Electric Industrial Co., Ltd., Japan

[21] Appl. No.: 357,737

[22] Filed: May 26, 1989

[30] Foreign Application Priority Data

May 27, 1988 [JP] Japan .................. 63-130676

[51] Int. Cl.$^5$ ........................... H04L 27/06
[52] U.S. Cl. ..................... 375/94; 329/311; 360/41
[58] Field of Search ............ 375/94, 95, 120, 75; 329/311; 360/36.1, 36.2, 41, 40; 358/261.1

[56] References Cited

U.S. PATENT DOCUMENTS

| | | | |
|---|---|---|---|
| 4,754,467 | 6/1988 | Banwart et al. | 375/94 |
| 4,813,059 | 3/1989 | Minuhin et al. | 360/36.1 |
| 4,827,489 | 5/1989 | Doi et al. | 375/94 |
| 4,835,620 | 5/1989 | Sakamoto | 360/36.1 |

FOREIGN PATENT DOCUMENTS 55-26494 7/1980 Japan .
58-57774 12/1983 Japan .
62-20442 1/1987 Japan .

OTHER PUBLICATIONS

"A Data Detection Method for a Stationary Head Digital Tape Recorder", by Junkichi Sugita et al.; Electronics Communications Conference, Electro-Acoustic Research Paper (Japan), 1982, EA82-59; pp. 33–40.

Primary Examiner—Stephen Chin
Attorney, Agent, or Firm—Lowe, Price, LeBlanc & Becker

[57] ABSTRACT

A data demodulation apparatus applicable to a playback input signal from a digital recording apparatus, which executes A/D conversion of the input signal with a sampling period that is equal to the bit separation of that signal, and obtains phase data for reproducing the phase of the clock signal component of the input signal each time that a "1" state bit is detected in a sampling period. For each sampling period, or set of successive sampling periods, data values are derived which respectively represent a number of bit positions of the input signal within that period and the presence or absence of "1" state bits in the period, and these data values are converted to serial form to respectively constitute a reproduced clock signal and a detected data signal.

10 Claims, 28 Drawing Sheets

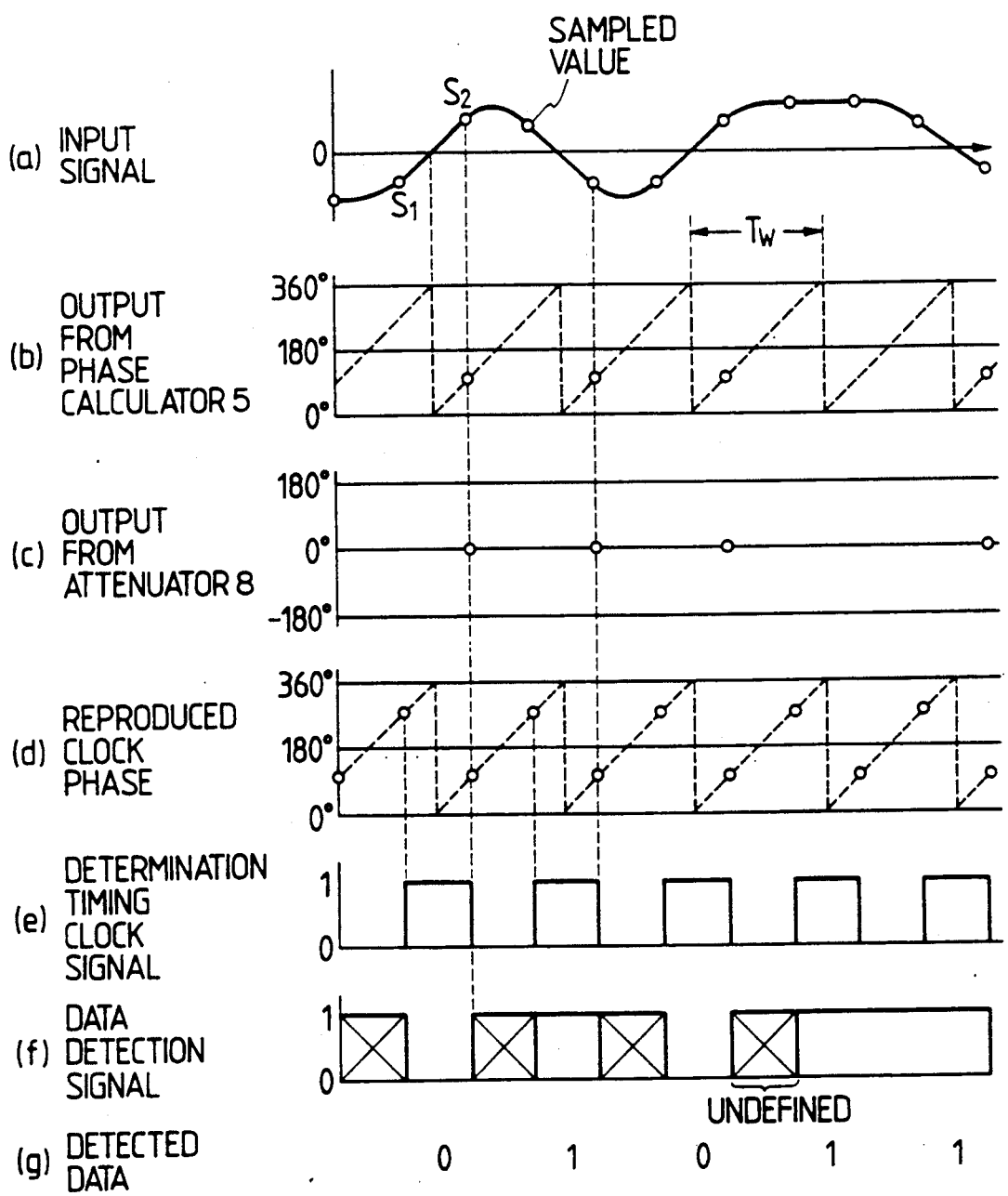

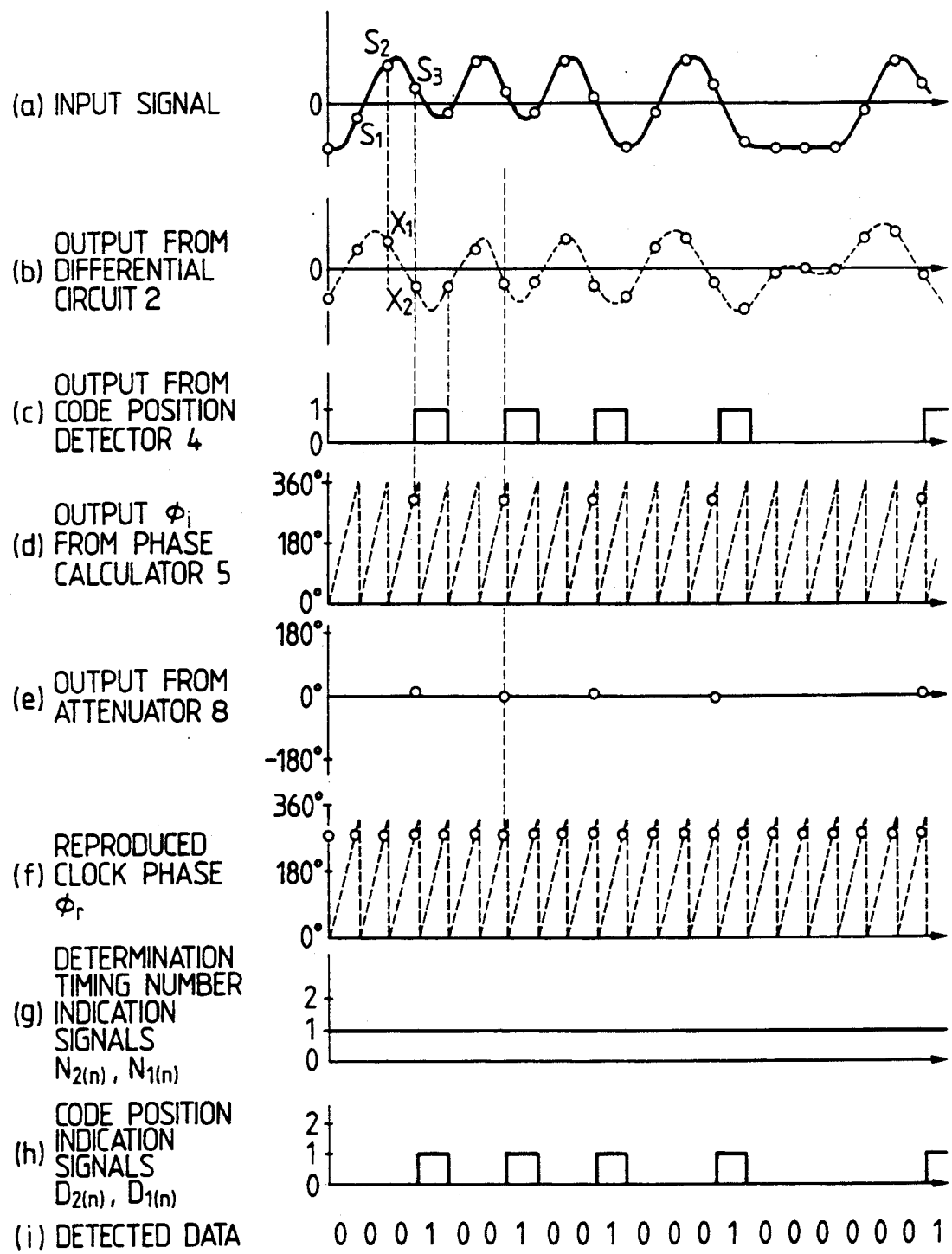

FIG. 7(a)

| $N_2(n)$ | $N_1(n)$ | DETERMINATION TIMING NUMBER |
|---|---|---|
| 0 | 0 | 0 |
| 0 | 1 | 1 |
| 1 | 0 | 2 |

FIG. 7(b)

| $D_2(n)$ | $D_1(n)$ | DETECTED DATA | |
|---|---|---|---|
| 0 | 0 | 0 | 0 |
| 0 | 1 | 1 | 0 |
| 1 | 0 | 0 | 1 |

FIG. 9

| (n-1) | (n) | $N_2(n-1)$ | $N_1(n-1)$ | $N_2(n)$ | $N_1(n)$ | PRESENT (n) | PAST (n) | $d_1(n)$ | $d_2(n)$ | $d_1(n+1)$ | $d_2(n+1)$ |
|---|---|---|---|---|---|---|---|---|---|---|---|
| NORM | NORM | 0 | 1 | 0 | 1 | 0 | 1 | * | ␣ | | |
| NORM | NORM | 0 | 1 | 0 | 1 | 1 | 0 | ␣ | * | | |
| NORM | UP | 0 | 1 | 1 | 0 | — | | ␣ | | * | ␣ |
| NORM | DOWN | 0 | 1 | 0 | 0 | — | | * | | | |
| UP | NORM | 1 | 0 | 0 | 1 | — | | ␣ | * | ␣ | |
| UP | DOWN | 1 | 0 | 0 | 0 | — | | ␣ | * | | |
| DOWN | NORM | 0 | 0 | 0 | 1 | — | | | | * | |
| DOWN | UP | 0 | 0 | 1 | 0 | — | | | | * | ␣ |

␣ : DETERMINATION TIMING POINT
* : INDICATES THAT "1" CODE IS ASSIGNED TO THAT DETERMINATION TIMING

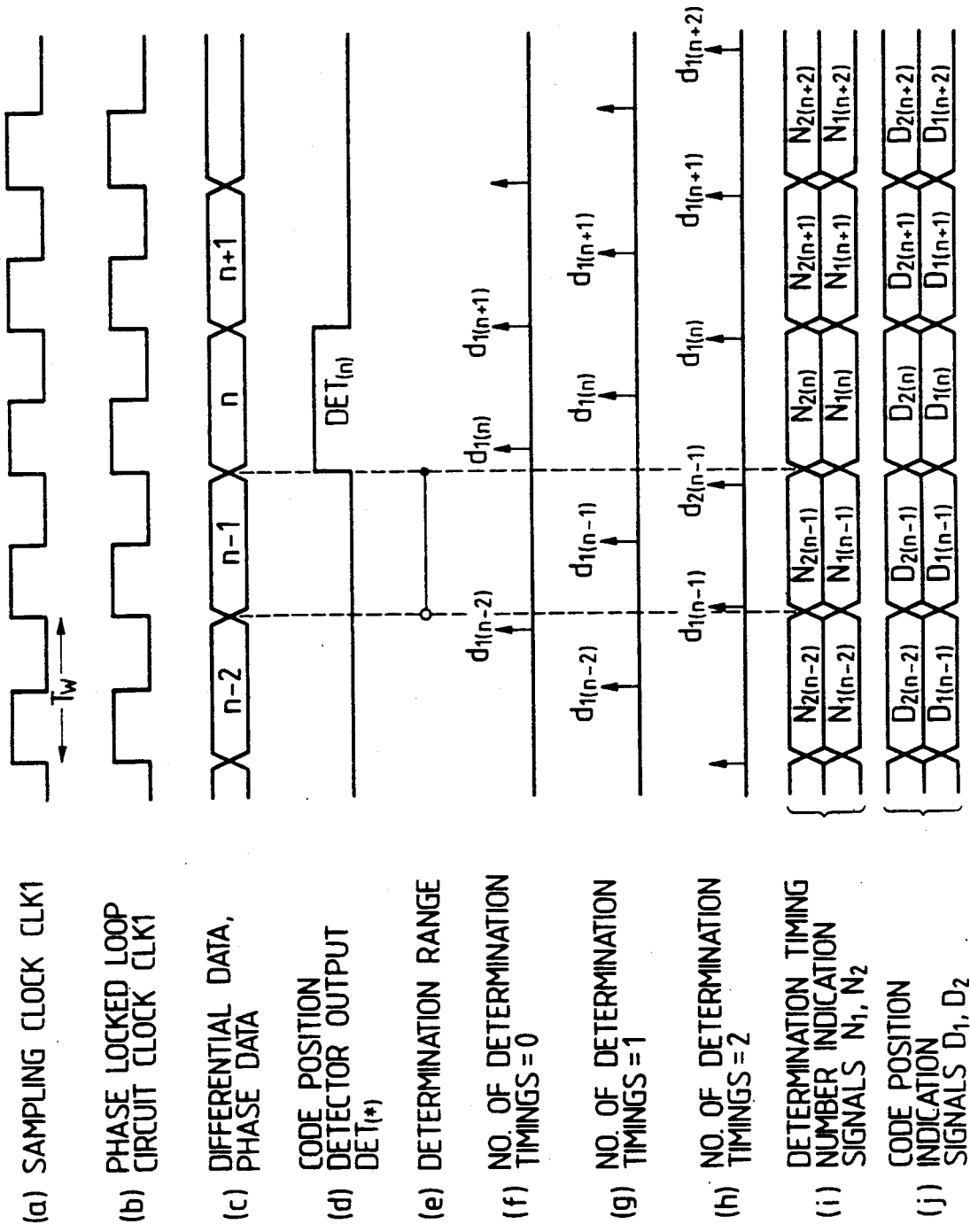

FIG. 24

| $N_2(n)$ | $N_1(n)$ | DETERMINATION NUMBER |
|---|---|---|
| 0 | 0 | 1 |
| 0 | 1 | 2 |
| 1 | 0 | 3 |

FIG. 25

| $D_2(n)$ | $D_1(n)$ | DETECTED DATA | | |
|---|---|---|---|---|
| 0 | 0 | 0 | 0 | 0 |
| 0 | 1 | 1 | 0 | 0 |
| 1 | 0 | 0 | 1 | 0 |
| 1 | 1 | 0 | 0 | 1 |

FIG. 27

| (n-1) | (n) | FPEAK (n) | RPEAK (n) | PRESENT (n) | PAST (n) | $d_1(n)$ | $d_2(n)$ | $d_3(n)$ | $d_1(n+1)$ | $d_2(n+1)$ | $d_3(n+1)$ |
|---|---|---|---|---|---|---|---|---|---|---|---|
| NORM | NORM | 1 | 0 | 0 | 1 | ⌊ | * | | ⌊ | ⌊ | |
| NORM | NORM | 1 | 0 | 1 | 0 | ⌊ | ⌊ | | ⌊ | * | ⌊ |
| NORM | UP | 1 | 0 | — | — | ⌊ | ⌊ | | ⌊ | * | ⌊ |
| NORM | DOWN | 1 | 0 | — | — | ⌊ | * | | ⌊ | ⌊ | |
| UP | NORM | 1 | 0 | — | — | ⌊ | ⌊ | * | ⌊ | ⌊ | |
| UP | DOWN | 1 | 0 | — | — | ⌊ | ⌊ | * | ⌊ | ⌊ | |
| DOWN | NORM | 1 | 0 | — | — | ⌊ | ⌊ | | * | ⌊ | |
| DOWN | UP | 1 | 0 | — | — | ⌊ | ⌊ | | * | ⌊ | ⌊ |
| NORM | NORM | 0 | 1 | 0 | 1 | ⌊ | ⌊ | | * | ⌊ | |
| NORM | NORM | 0 | 1 | 1 | 0 | ⌊ | ⌊ | | ⌊ | * | |
| NORM | UP | 0 | 1 | — | — | ⌊ | ⌊ | | ⌊ | * | ⌊ |
| NORM | DOWN | 0 | 1 | — | — | ⌊ | ⌊ | | * | ⌊ | |
| UP | NORM | 0 | 1 | — | — | ⌊ | ⌊ | ⌊ | * | ⌊ | |
| UP | DOWN | 0 | 1 | — | — | ⌊ | ⌊ | ⌊ | * | ⌊ | |
| DOWN | NORM | 0 | 1 | — | — | ⌊ | ⌊ | | ⌊ | * | |
| DOWN | UP | 0 | 1 | — | — | ⌊ | ⌊ | | ⌊ | * | ⌊ |

⌊ : DETERMINATION TIMING POINT
\* : INDICATES THAT "1" CODE IS ASSIGNED TO THAT DETERMINATION TIMING

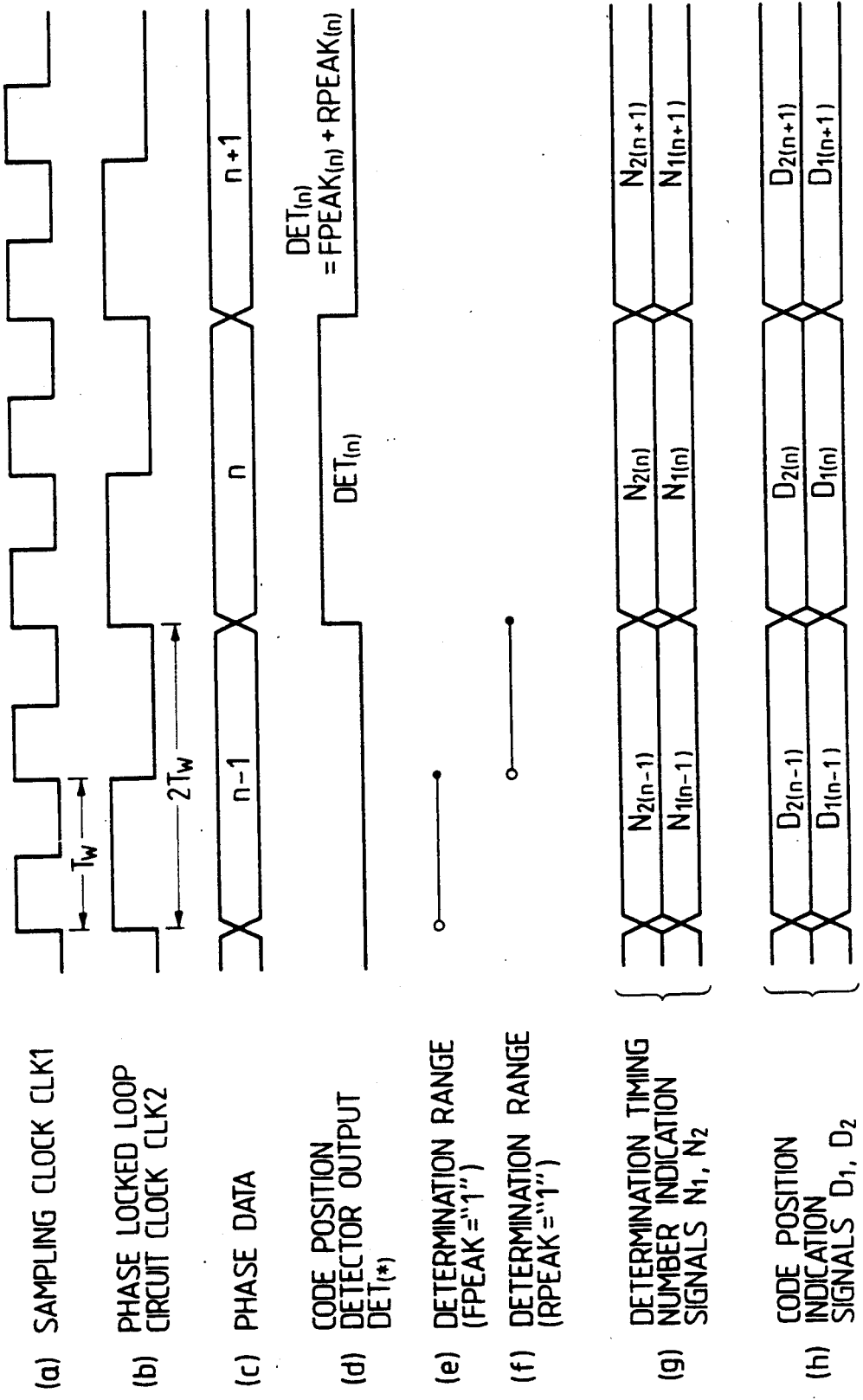

FIG. 31
(a) 2/7 RLLC NRZ SIGNAL 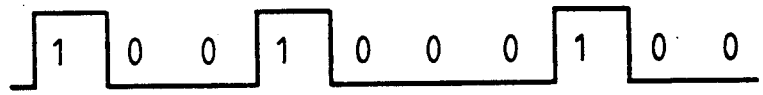
(b) PLAYBACK 2/7 RLLC NRZ SIGNAL 
(c) 2/7 RLLC NRZI SIGNAL 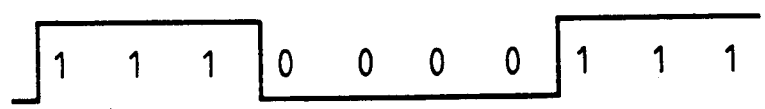
(d) PLAYBACK 2/7 RLLC NRZI SIGNAL 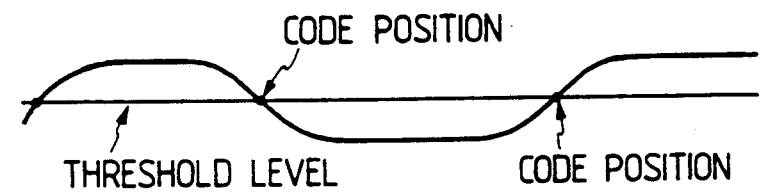
(e) DETECTED DATA  1  0  0  1  0  0  0  1  0  0

DATA DEMODULATION APPARATUS

BACKGROUND OF THE INVENTION

1. Field of the Invention

The present invention relates to a data demodulation apparatus for demodulation of digital data signals such as a pulse code modulation (hereinafter referred to as PCM) playback signal produced from a digital data recording apparatus. In particular, the invention is directed towards a data demodulation apparatus applicable to a playback signal from an optical disc apparatus which has been recorded using NRZ or NRZI modulation.

2. Prior Art Technology

With a prior art optical disc apparatus, the size of each region that is formed on the recording medium to express a "1" state bit of a recording signal is limited by the minimum size of the light spot that is projected onto the disc surface for reading the data during playback operation. For this reason, a method of coding a PCM signal prior to recording has been developed, referred to as the 2, 7 RLLC (run length limited code). With that method, as described for example in Japanese Patent Laid-open No. 55-26494, the minimum distance $T_{min}$ between transitions of the (2, 7) RLLC signal (e.g. the minimum separation between successive "1" state bits) is greater than the bit separation $T_w$ (i.e. the period between successive bits). This enables the shortest wavelength of the recorded signal to be substantially increased. In general, $T_{min}$ is based on "1" state bits, i.e. every two successive "1" state bits in the (2, 7) RLLC signal are mutually separated by a plurality of "0" state bits. If such a (2, 7) RLLC signal is then recorded by NRZ modulation, and a playback signal subsequently obtained from the recording medium, the time point of each peak in the playback signal will represent the center of a bit window containing a "1" state bit. Thus by using these time points, e.g. to control a phase locked loop circuit circuit, the clock frequency component of the playback signal can be recovered as a determination timing clock signal. Each time this determination timing clock signal attains a specific phase value (i.e. 0°), a specific bit position (e.g. the center of a bit window of a "1" or "0" bit) in the playback signal is defined, so that the determination timing clock signal can be used to demodulate that signal. Alternatively, if the (2, 7) RLLC signal is recorded by NRZI modulation, the zero-crossing points of the playback signal will indicate the positions of respective "1" bit window centers, and so can be similarly used to recover the clock component of the playback signal.

Such prior art demodulation methods have been generally based on analog techniques for detecting code positions in the playback signal, where the term "code position" as used in the present specification and claims refers to the time-axis position of the center of a bit window defining a "1" state bit in the playback signal. In the case of a (2, 7) RLLC signal, such methods detect the peak points or zero-crossing points of that signal. However there have been proposals for utilizing digital techniques to implement all of the functions of such a data demodulation apparatus. An example of such a prior art proposal, for a data demodulation apparatus to be used with an input signal $S_i$ that has been recorded after applying (8-10) conversion, has been described in an Electronics Communications Conference, Electroacoustic Research Paper (Japan), 1982, EA82-59. With the (8-10) conversion method, as opposed to the (2, 7) RLLC method, the minimum distance between transitions of the resultant signal is identical to the bit separation of the signal, and hence it is necessary to detect the absolute level of the signal in order to obtain the positions of "1" and "0" code bits. FIG. 1 shows the general configuration of that proposed apparatus. The input signal $S_i$ is first periodically sampled by an A/D (analog-to-digital) converter 508, with a sampling period that is defined by a processing clock signal, and the sample values are then delayed by one period of the processing clock signal by a delay circuit 509. The resultant delayed sample values and the non-delayed sample values are both supplied to each of a phase calculator circuit 511 and a code position detector 510. Output values from the phase calculator circuit 511 and the code position detector 510 are supplied to a digital phase locked loop circuit 517, which produces digital values representing reproduced clock phase $\phi_r$. A data determiner 518 produced detected data and a determination timing clock. The operation of this apparatus is as follows, referring to the waveform diagram of FIG. 2, defining the bit separation of the input signal $S_i$ as $T_w$, and the sampling period of the A/D converter 508 (i.e. the processing clock period) as $T_w/2$. Successive quantized digital data values are obtained, and all of the subsequent processing is executed in synchronism with the processing clock signal, i.e. at the sampling frequency. Due to the operation of delay circuit 509, successive pairs of sample values (e.g. values S1 and S2 in FIG. 2(a)) are supplied in parallel to the phase calculator 511 and position detection circuit 510. Based on these pairs of sample values, the code position detector 510 produces a "1" level output as signal Dec, indicating that a zero-crossing position of the input signal $S_i$ has occurred, when the following condition is detected for two successive sample values S1 and S2:

$$S1 \times S2 \leq 0, \text{ and } S2 \neq 0 \quad (1)$$

Each time that the above conditions are satisfied, so that a "1" level output is produced from the code position detector 510, the phase calculator 511 computes a value $\phi_i$ which represents the phase difference between that zero crossing point and the timing of sample S2. It can be understood that with this apparatus, each zero-crossing point of the input signal $S_i$ is detected as a reference point of the reproduced clock phase. $\phi_i$ is computed by linear interpolation as:

$$\phi_i = \{S2/(S2-S1)\} \times 180° + 180° \quad (2)$$

Each value of $\phi_i$ thus obtained is supplied to the phase locked loop circuit 517, and substracted from the output value $\phi_r$ produced from the loop, to obtain a phase error $\phi_e$. If $\phi_i$ is valid, i.e. actually corresponds to a detected code position, it is transferred through a switch 513 and attenuator 517, to be applied to compensate the value of $\phi_r$.

Judgement as to whether a "1" or a "0" bit position of the input signal $S_i$ has been detected is executed for each sampling time point as follows. A determination timing clock signal is derived by the data determiner 518 from the reproduced clock phase $\phi_r$, as illustrated in FIG. 2(e). During each interval (beginning with a sample S2) in which that determination timing clock signal is at the "1" level, if the two consecutive sample values S1 and S2 are both positive, then a "1" level output (i.e. a "1"

bit) is produced as the detected data, while if the sample values S1 and S2 are both negative, then a "0" level output (a "0" bit) is produced as the detected data. If the two consecutive sample values are of mutually different sign, then this indicates that a zero-crossing point of the input signal has occurred, so that no determination of a "1" or "0" bit state can be made. Computations to obtain such detected data bits, designated in the following as Data, are executed as follows:

If $S1 \times S2 < 0$, $$Data = sgn((S1 - S2) \times \phi_r + S2 \times 180°)$$

If $S1 \times S2 \geq 0$, $$Data = sgn(S1) \quad (3)$$

Where sgn (.) signifies "the sign of (.)", i.e. with Data representing a "1" logic level if a positive sign is obtained, and a "0" level if a negative sign is obtained.

The above apparatus has three disadvantages. Firstly, it is not applicable to an input signal $S_i$ which has been generated by (2, 7) RLLC modulation, and can only demodulate an (8-10) converted signal. Secondly, it is necessary to execute multiplication operations to perform data determination. The need to perform multiplications, results in substantial circuit scale and complexity. Thirdly, with that and all similar types of data demodulation apparatus which utilize A/D conversion of the input signal $S_i$, the sampling period of the conversion can be no greater than one half of the bit separation $T_w$ of the input signal $S_i$. Thus, a high sampling frequency must be used, while in addition all processing of the sample values and subsequent computation operations etc. must be performed using a processing clock frequency that is identical to the sampling frequency. This is difficult to implement if the bit rate of the input signal $S_i$ is very high.

It would be advantageous if such a data demodulation apparatus could function with a sampling frequency that is substantially lower than the input signal $S_i$ bit rate. However this has not been possible in the prior art, due to a fundamental problem which arises from the fact that the sampling signal source and the input signal source are different. Even if the sampling frequency is set very precisely to the nominal value of bit rate of a playback signal applied as an input signal, in a practical recording/playback apparatus there will be various degrees of random or periodic variations in the bit rate of the input signal. Even if that bit rate is absolutely constant, with no phase drift, any slight difference between the sampling frequency and the input signal $S_i$ bit rate will result in periodic drift of the phase relationship between the sampling signal and the input signal $S_i$ out of one (0° to 360°) range to another range. This is illustrated in FIGS. 3(a) and 3(b), in which a reproduced clock phase (representing the phase of a clock component of the input signal) is derived based on detecting each peak point of the input signal as a code position. The input signal portion shown represents a bit sequence of "0" "0" "1" "0" "0" "0", with a bit separation of $T_w$. Each point at which the reproduced clock phase reaches 0° is a determination time point, which defines a bit position of the input signal $S_i$. If the sampling frequency is slightly higher than the bit rate of the input signal $S_i$, then a condition shown in FIG. 3(a) will periodically occur, in which two samples $S_{n-1}$ and $S_n$ occur within a single bit period of the input signal $S_i$. Thus, no determination time point is established for the sample period between $S_{n-1}$ and $S_n$. Conversely, if the sampling frequency is slightly lower than the bit rate of the input signal $S_i$, then a condition shown in FIG. 3(b) will periodically occur, in which two samples $S_{n-2}$ and $S_{n-1}$ respectively occur just before and just after a single bit period of the input signal $S_i$, i.e. there are two determination time points within the sampling period $S_{n-2}$ to $S_{n-1}$. Such a condition will occur for example once in every 100 sampling periods, if the frequency of the clock signal component of the input signal $S_i$ (i.e. bit rate) is 1% higher than the sampling frequency of the A/D converter 1.

The conditions shown in FIGS. 3(a), 3(b) can also occur randomly, due to the effects of jitter in the playback signal. Operation of a prior art data demodulation apparatus such as that described above is based on the fact that a single determination time point always occurs within every second sampling period, and it has not been practicable in the prior art to utilize a sampling period that is substantially identical to the bit separation, for A/D conversion of a playback PCM signal prior to demodulation by a data demodulation apparatus.

SUMMARY OF THE INVENTION

It is an objective of the present invention to overcome the problems of the prior art described above, by providing a data demodulation apparatus which enables accurate and stable demodulation to be executed of a digital data input signal obtained as a playback signal from a digital data recording/playback apparatus, and which is applicable to an input signal that has been encoded by a method such as the (2, 7) RLLC method whereby the minimum distance between transitions $T_{min}$ in the signal is greater than the bit separation $T_w$ of that signal.

It is a further objective of the present invention to provide a data demodulation apparatus in which analog/digital conversion of a digital data signal applied as an input signal is executed prior to processing of the signal, and in which the sampling period utilized in that analog/digital conversion is substantially identical to the bit separation $T_w$ of the input signal.

To achieve the above objectives, a data demodulation apparatus according to the present invention for demodulating a bi-level pulse code modulation input signal comprises:

means for generating a processing clock signal having a fixed period which is identical to a bit separation of said input signal;

analog/digital conversion means controlled by the processing clock signal for periodically sampling said input signal at successive sampling time points separated by sampling periods, to produce successive digital sample values, said sampling periods being respectively identical to periods of said processing clock signal;

means responsive to said sample values for detecting each occurrence of a code position of the input signal within a sampling period and for generating a detection signal indicative of such detection;

means functioning upon each detection of a code position to derive an input phase value of a reproduced clock phase, the input phase value being established with respect to the code position as a reference phase value; and means responsive to said detection signal and successive ones of said input phase values for generating a first output data signal and second output data signal, said first output data signal comprising, during each period of said processing clock signal, determination time point number indication data indicating a number of determination time points, said determination time points representing respective bit positions of said input signal which have occurred during a specific one of said sampling periods, and said second output data signal comprising, during said each period of the processing clock signal, code position indication data indicating the presence of any code position detected during said specific sampling period and indicating a time relationship of said code position to said determination time points.

A data demodulation apparatus according to the present invention executes recovery of phase values of a clock signal component of the input signal as a reproduced clock phase, based on successively obtained values of input phase each representing a phase difference between a code position of the input signal and a sampling time point, with each input phase value being applied to derive an error signal for compensating a phase locked loop circuit which generates the reproduced clock phase values. Successive digital computations performed on a combination of an input phase value, a reproduced clock phase value, a value of phase error between the input phase and the reproduced clock phase, a signal indicating whether or not a carry operation was executed during a preceding operation to derive the current value of reproduced clock phase, and a signal indicating whether a code position of the input signal $S_i$ has been detected, data are derived which indicate a number of determination time points that have occurred within one sampling period or within a fixed number of successive sampling periods, where each determination time point is expressed as a point at which the reproduced clock phase attains the aforementioned reference phase value, and data are also derived which indicate the presence or absence of any code position within that sampling period or set of sampling periods, as well as the specific ones of the determination time points within that sampling period or set of sampling periods to which the code position(s) are assigned.

As a result, whereas with a prior art data demodulation apparatus such as that described hereinabove it is necessary to utilize a sampling period for A/D conversion which is at least twice the bit separation of the input signal $S_i$, a data demodulation apparatus according to the present invention can utilize a substantially longer sampling period, which is identical to that bit separation.

It is moreover an advantage of the present invention that, following an operation of A/D conversion utilizing a sampling period that is equal to the bit separation, all subsequent processing operations can be executed on data from sets of successively occurring sampling periods, e.g. on pairs of consecutive sampling periods, so that the processing clock period utilized for that subsequent processing can be made even longer than the bit separation of the input signal $S_i$. Such an apparatus is therefore highly advantageous for application to demodulation of digital data supplied at a very high bit rate.

A data demodulation apparatus according to the present invention is can be configured for application to either NRZ (non return to zero) and NRZI (non return to zero inverted) input data. Such an apparatus has the further advantage of simplicity of operation when applied to a (2, 7) RLLC NRZI input signal, since in that case each code position of the input signal $S_i$ can be detected simply as a zero-crossing condition, in which two successive digital samples of the input signal $S_i$ are of opposite sign.

BRIEF DESCRIPTION OF THE DRAWINGS

FIG. 2 waveforms a-f are timing diagrams for assistance in describing the apparatus of FIG. 1;

FIG. 6 is a timing diagram for describing the basic operation of the embodiment of FIG. 4 as applied to a specific portion of a (2, 7) RLLC NRZ input signal $S_i$;

FIGS. 7(a) and 7(b) are tables respectively showing the relationship between bits states of determination time point number indication data N1, N2 and corresponding determination time points within a sampling period, and between bits states of code position indication data D1, D2 and corresponding code positions within a sampling period, for the embodiment of FIG. 4;

FIG. 8 is a timing diagram for further describing the operation of the embodiment of FIG. 4;

FIG. 9 is a table for describing relationships between determination time point number indication data derived for two successive sampling periods, various logic signals generated within a data determiner in FIG. 4 for these sampling periods, and corresponding positions of determination time points and code positions assigned to these sampling periods by the data determiner;

FIGS. 24 and 25 are tables respectively showing the relationship between bits states of determination time point number indication data N1, N2 and corresponding determination time points within a processing clock period, and between bits states of code position indication data D1, D2 and corresponding code positions within a processing clock period, for the embodiment of FIG. 22;

FIG. 26 is a timing diagram for further describing the operation of the embodiment of FIG. 22;

FIG. 27 is a table for describing relationships between determination time point number indication data derived for a set of four successive sampling periods of the input signal $S_i$, various logic signals generated within a data determiner in FIG. 22 for that set of sampling periods, and corresponding positions of determination time points and code positions assigned to that set of sampling periods by the data determiner, for the embodiment of FIG. 22;

FIG. 31 is a timing diagram illustrating examples of a (2, 7) RLLC NRZ signal prior to recording and after playback respectively, and of a (2, 7) RLLC NRZI signal prior to recording and after playback respectively.

DESCRIPTION OF PREFERRED EMBODIMENTS

Figure 4:
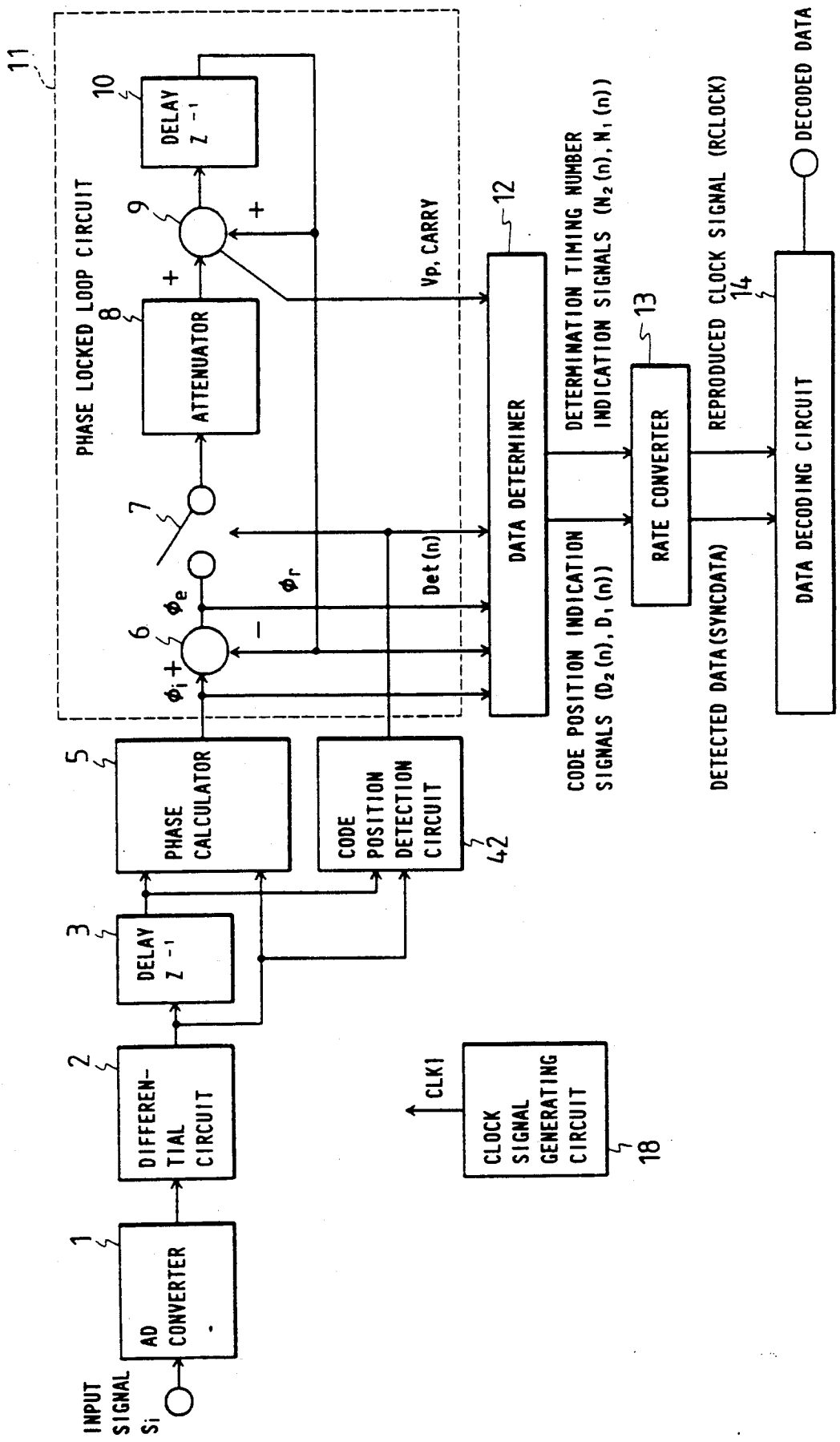
FIG. 4 is a block diagram showing the general configuration of a first embodiment of a data demodulation apparatus according to the present invention, for demodulation of a (2, 7) RLLC NRZ input signal $S_i$.

FIG. 4 shows the general configuration of a first embodiment of a data demodulation apparatus according to the present invention. An input digital data signal $S_i$, which is a playback signal derived from a PCM signal recorded by (2, 7) RLLC NRZ modulation, is supplied to an A/D converter 1, to be periodically sampled with a fixed sampling period to thereby obtain successive quantized digital sample values. The sampling period is identical to the nominal value of bit separation of the input signal $S_i$. The sample values from the A/D converter 1 are supplied to a differential circuit 2, and difference values produced from the differential circuit 2 are supplied directly to inputs of a phase calculator circuit 5 and a code position detection circuit 4, and also through a delay circuit 3 (which provides a delay equal to one sampling period) to other inputs of the phase calculator circuit 5 and code position detection circuit 4. Values of input phase, each representing a phase difference between a sampling time point and the occurrence of a detected code position in the the input signal $S_i$, are produced from the phase calculator circuit 5 as described hereinafter, each time that a code position is detected. A code position is detected as a peak value of the input signal $S_i$, by the code position detection circuit 4, and each time that such detection occurs, an output signal Det(n) from the code position detection circuit 4 goes from the "0" to the "1 logic level during one sampling period. A digital PLL circuit 11 includes a subtractor 6, a switch 7, an attenuator 8, an adder 9 and a delay circuit 10 which provides a delay of one sampling period. The digital PLL circuit 11 operates in synchronism with a processing clock CLK1, generated from a clock signal source 18, which is also the sampling clock signal points of the A/D converter 1, i.e. each sampling period of the A/D converter 1 corresponds to one period of processing clock CLK1. It will be assumed that each sampling time point corresponds to a rising edge of CLK1, and each rising edge of a processing clock will be referred to as a processing clock time point.

Each input phase value $\phi_i$ has a value of reproduced clock phase $\phi_r$ substracted therefrom by the subtractor 6, and the resultant value of phase error $\phi_e$ is transferred to an attenuator 8 under the control of a switch 7. If $\phi_i$ is valid, i.e. represents a phase difference with respect to an actual code position (peak value) of the input signal $S_i$, then signal Det(n) controls the switch 7 to transfer the corresponding value of $\phi_e$. The attenuated output phase error value from the attenuator 8 is added to the reproduced clock phase $\phi_r$ by an adder 9, and the result is produced as an amended value of $\phi_r$, to be supplied to the delay circuit 10.

The basic operation of the above circuits will be described referring first to the timing diagram of FIG. 5. Designating three successive sample values as S1, S2 and S3 shown in FIG. 5(a), if a peak value of the input signal $S_i$ (indicating the center of the bit window of a "1" code position) is detected by the code position detection circuit 4 as having ocurred within one of the two sampling periods from S1 to S3, then the output from the code position detection circuit 4 goes to the "1" level. At the same time, an input phase value $\phi_i$ is produced from the phase calculator circuit 5, and supplied to the digital PLL circuit 11. Ideally, if the exact center of a "1" bit window has been detected, then $\phi_i$ should exactly represent the phase value which the clock signal component of the input signal $S_i$ has at the sample time point of S3. Thus, any difference between the value of reproduced clock phase $\phi_r$ and $\phi_i$ at that time point represents a phase error of $\phi_r$, and this error $\phi_e$ is therefore applied through the attenuator to the adder 9 to correct the value of $\phi_r$.

Each point at which the reproduced clock phase $\phi_r$ equals 0° (ideally representing the center of a bit window of the input signal $S_i$) is referred to as a determination time point, which is utilized by a data determiner circuit 12 (described hereinafter) in generating data representing the data sequence within each sampling period.

Figure 5:
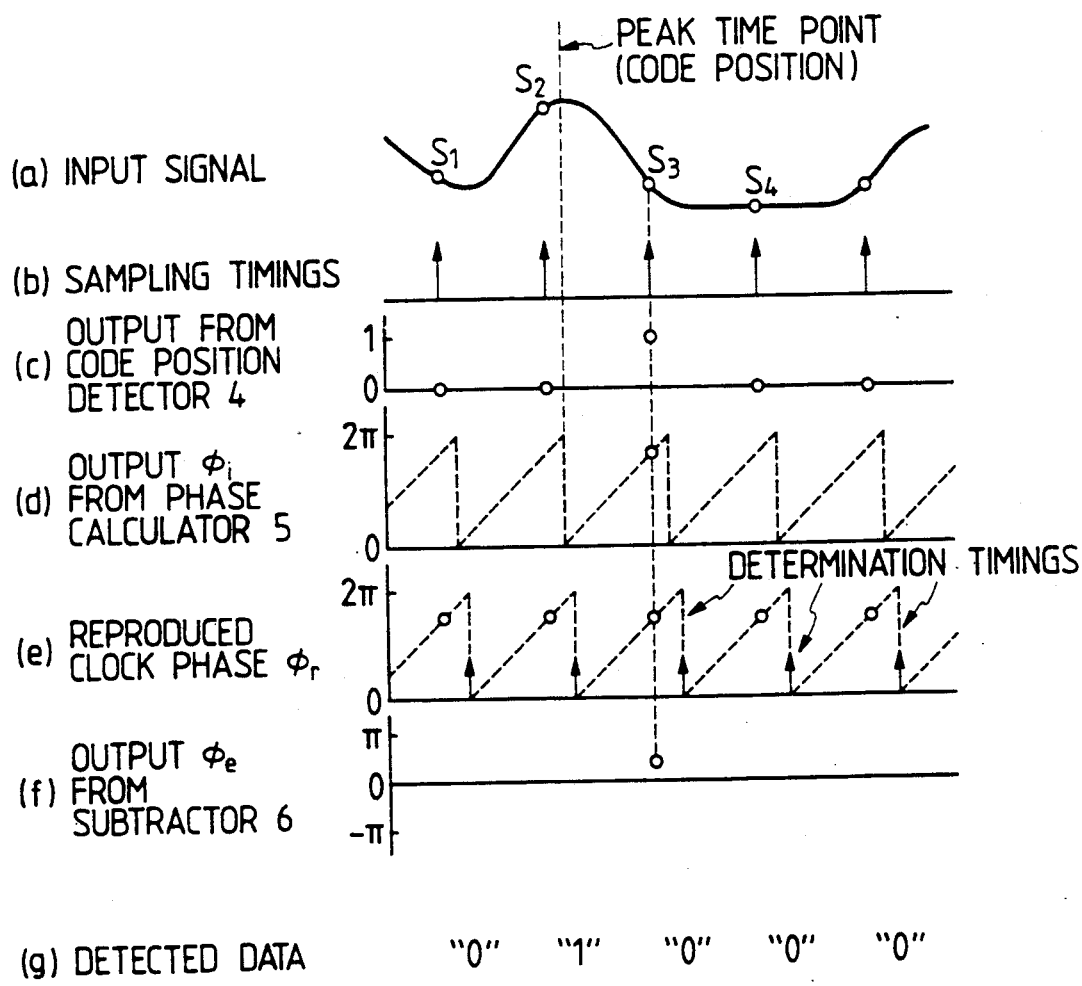
FIG. 5 is a timing diagram for describing the basic operation of the embodiment of FIG. 4.

Although the timings of outputs from the code position detection circuit 4 and phase calculator circuit 5 are indicated as occurring at the timing of S3, this and the other time-axis relationships shown in FIG. 5 are intended only for ease of illustration, and in practice the outputs are delayed by fixed numbers of sampling periods as required for the necessary computations.

Furthermore although circuit 11 is referred to as a phase locked loop circuit, it should be understood that the operation is not based upon a voltage-controlled oscillator or counter, and that values of reproduced clock phase are obtained from the circuit only at each of successive processing clock time points, as indicated by the small circles in FIG. 5(e).

For each sampling period, the data determiner circuit 12 produces a first pair of data bits D2(n), D1(n) which indicate the number of determination time points that occur during that sampling period (i.e. 0, 1 or 2) and a second pair of data bits N2(n), N1(n) which indicate whether a code position (a "1" bit) of the input signal $S_i$ occurs within that sampling period and also the determination time point to which any code position corresponds. Since each determination time point that does not correspond to a code position must represent a "0" bit, the bit sequence of the input signal $S_i$ is completely defined by sequential output data values from the data determiner circuit 12. These data are supplied to a rate converter circuit 13, to be converted into a serial detected data signal syncdata and reproduced clock signal Rclock. The Rclock signal is not continuous, but during each processing clock period a number of Rclock (i.e. reproduced clock) pulses equal to the number of determination time points that have been assigned to that period by the data determiner circuit 12 are successively outputted from the rate converter circuit 13 with a fixed period. At the same time, the sequence of "1" and "0" data bits that occur during that sampling period are produced from the rate converter circuit 13 as a signal syncdata, synchronized with the Rclock pulses.

A data decoding circuit 14 functions to decode the Syncdata signal, to convert the (2, 7) RLLC data back to the original PCM data format, and outputs the result as a decoded data signal. Since circuits for executing such decoding are known in the art, no description of the configuration of circuit 14 will be given in the following.

The operation of the circuit of FIG. 4 will be described in greater detail for a specific bit sequence of an input signal $S_i$, referring to the timing diagram of FIG. 5. FIG. 5(a) shows an input signal $S_i$, which is a (2, 7) RLLC NRZ data signal obtained by playback from a recording medium, with each peak in the signal indicating a "1" bit position, i.e. a code position as defined hereinabove. Three successive sample values obtained by the A/D converter 1 are indicated as S1, S2 and S3, with a peak occurring between S1 and S2. When value S2 is obtained, the differential circuit 2 computes the difference value (S1-S2), as the value X1, then at time point S3, the differential circuit 2 computes (S2-S3), as the difference value X2. When value S3 is obtained, the code position detection circuit 4 judges that a code position has occurred in the one of the two sampling periods from S1 to S2 and from S2 to S3, if the following conditions are satisfied:

$$X1 \geq 0, \text{ and } X2 < 0 \quad (4)$$

While in addition, in order to avoid the detection of "false peaks", the code position detection circuit 4 also judges whether the following condition is satisfied;

$$(X1-X2) > V_{ref} \quad (5)$$

Where $V_{ref}$ is a predetermined voltage level. If the above relationships (4) and (5) are satisfied, then the code position detection circuit 4 produces an output signal Det(n) at the "1" level during one sampling period, as indicated in FIG. 6(c).

In addition, the phase calculator circuit 5 computes a value of input phase $\phi_i(n)$, representing the phase difference between the code position and the sampling time point which terminates the sampling period in which the code position occurred, using the following equation:

$$\phi_i(n) = \{X2/(X2-X1)\} \times 360° + 180° \quad (6)$$

The value of $\phi_i(n)$ thus obtained is applied to compensate the reproduced clock phase $\phi_r$ produced from the digital PLL circuit 11. This occurs each time that a code position has been detected, i.e. each time that switch 7 is closed in response to a "1" state of the output signal Det(n) from the code position detection circuit 4. The attenuator 8 serves to limit the range of phase error that is outputted therefrom to either +1, 0, or −1. This assures greater stability of control of the phase locked loop circuit when sudden large changes in the value of $\phi_e$, and so provides improved accuracy of operation. It would be possible to utilize a low-pass filter in place of the attenuator 8, to achieve a similar result.

Figure 1:
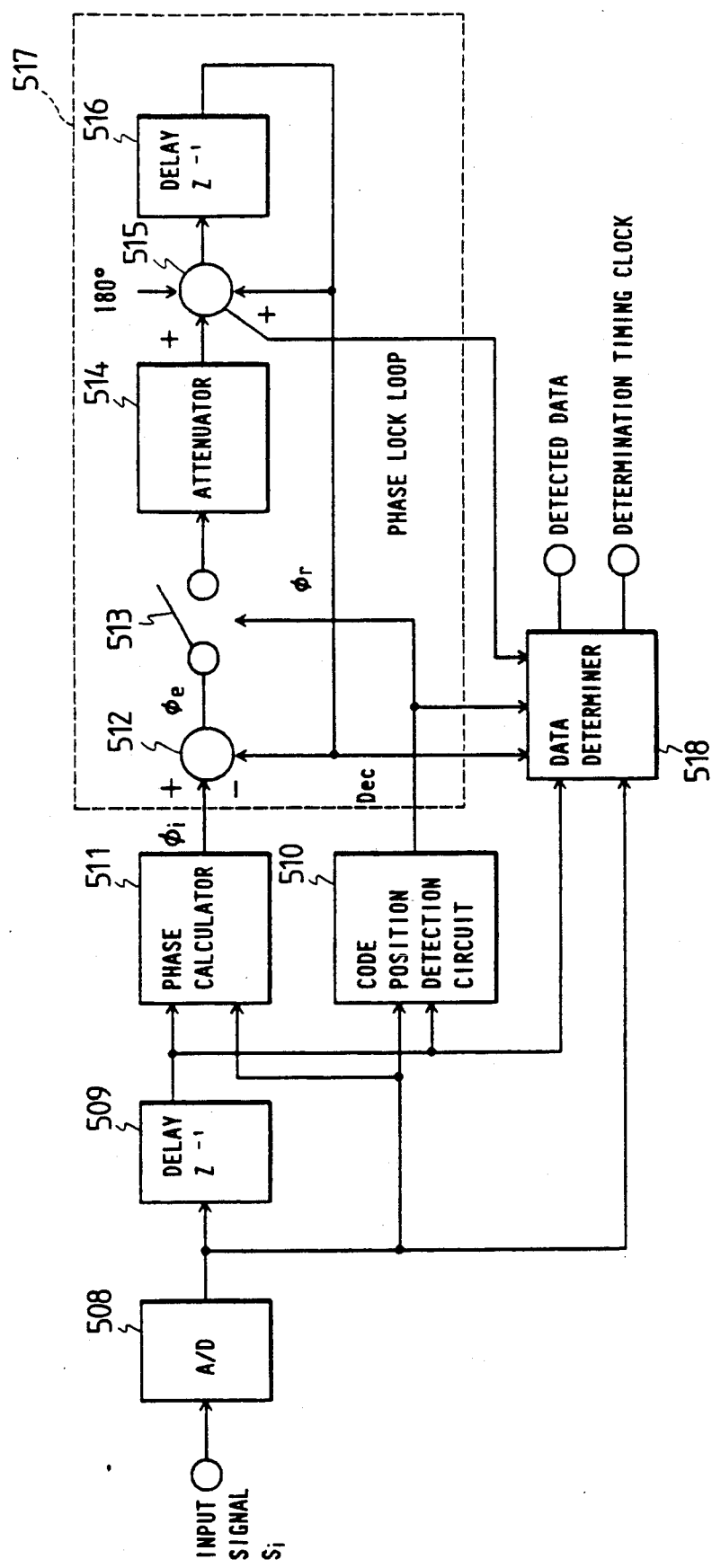
FIG. 1 is a block diagram showing the general configuration of a prior art data demodulation apparatus for demodulation of an (8-10) converted input data signal.
Figure 3A:
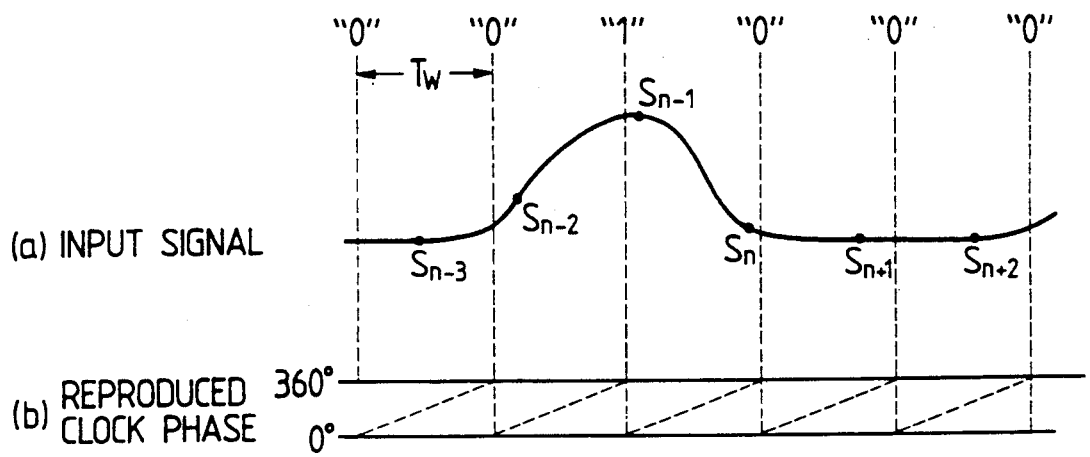
FIGS. 3(a), 3(b) are timing diagrams illustrating an operation of periodically sampling an input data signal using a sampling period that is substantially identical to the bit separation of that input signal $S_i$.
Figure 3B:
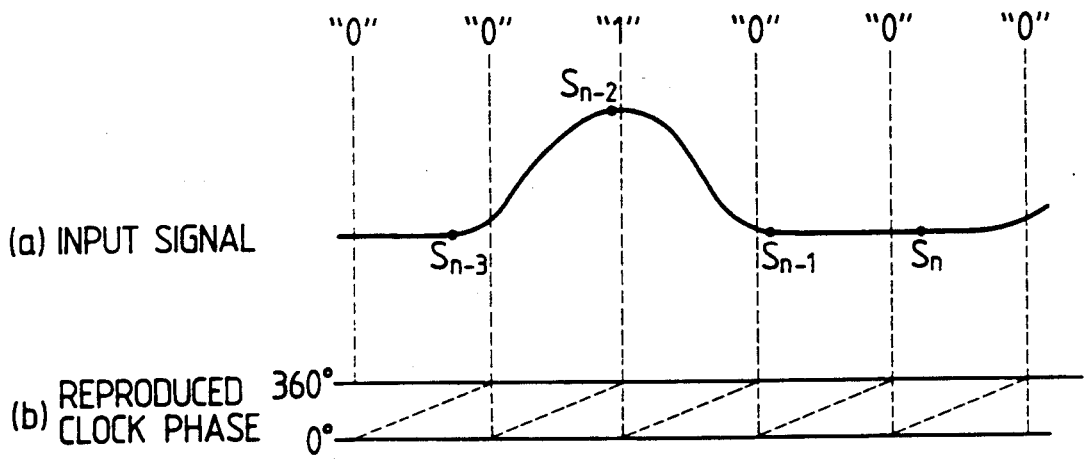

The attenuated error output from the attenuator 8 is applied to one input of a full adder 9, while the reproduced clock phase $\phi_r$ is applied to the other input of the adder 9. The reproduced clock phase $\phi_r$ is a 4-bit digital value, and the maximum output value from the adder 9 (i.e. an all "1" s output) represents a value close to but less than 360°, so that a change from the all "1" state to the all "0" s state of the adder output represents a change in the value of $\phi_r$ from one 0° to 360° range up into the next 0° to 360° range. Similarly, a change from the all "0" state to the all "1" state of the output from the adder 9 signifies a shift downward from one 0° to 360° range to another range. Each time that a change upward from one range to another occurs, the carry bit of the adder 9 will go to the "1" state. For ease of understanding, the MSB (most significant bit) of the adder 9 output (i.e. the MSB of $\phi_r$) is referred to as Vp, when used by the data determiner circuit 12 (as described hereinafter) in conjunction with the carry bit Carry to compute whether a condition has occurred as described for FIGS. 3(a) and 3(b) in which either zero or two determination time points have occurred within a single sampling period. Otherwise, the MSB of $\phi_r$ is designated as $\phi_r$. The output value from the adder 9 is transferred through a delay circuit 10, which provides a delay of one period of the processing clock CLK1. The output from the delay circuit 10 is designated as the reproduced clock phase $\phi_r$, but actually represents only those values of reproduced clock phase which occur at corresponding sampling time points. Each time at which the reproduced clock phase reaches 0° corresponds approximately to a bit position of the input signal (i.e. center of a bit window). These time points are referred to as determination time points.

During each period of CLK1, the data determiner circuit 12 produces a 2-bit determination timing indication data value (N2(n), N1(n)) which represents the number of determination time points which have occurred within a corresponding sampling period of the input signal $S_i$, and a 2-bit code position indication data value (D2(n), D1(n)) which indicates whether a code position has occurred within that corresponding sampling period and, if so, the determination time point to which the code position is assigned.

A rate converter circuit 13 executes parallel-to serial conversion of these data values, to obtain a serial clock pulse signal Rclock and a detected data signal Syncdata.

The time axis relationships of different signals shown in FIG. 6 are intended only for simplicity of description, and do not represent the precise actual relationships, as will be clear from the following.

The operation of the data determiner circuit 12 will be described referring to FIGS. 7(a), (b), 8 and 9. In these diagrams, the suffix (n) appended to a signal name signifies the state of that signal during a current period of the clock signal CLK1, i.e. the $n^{th}$ period of CLK1. A signal with the suffix (n−1) indicates the state of the signal during the immediately preceding period of CLK1. FIGS. 8(a), (b) show that the same clock signal CLK1 is used both as the processing clock for the digital PLL circuit 11 and as the sampling clock signal for the A/D converter 1 in this embodiment. The timings of successive values of differential data (i.e. difference values) and phase data are indicated in FIG. 8(c). In each CLK1 period, the data determiner circuit 12 executes a logic computation based on the values of signal Vp and Carry during that period, to establish the number of determination time points that have occurred during the sampling period corresponding to that CLK1 period (i.e. either 0, 1 or 2 as described referring to FIGS. 3(a), 3(b)), and generates a corresponding 2-bit data value N2(n), N2(n) referred to as the determination time point number indication data.

A "1" state pulse of the Det(n) output signal from the code position detection circuit 4 is shown in FIG. 9(d) as being produced during the $n^{th}$ period of CLK1, indicating that a code position has been detected by the code position detection circuit 4 as having occurred in the sampling period corresponding to the $n^{th}$ period of CLK1 or in the succeeding sampling period (corresponding to CLK1 period (n+1)). In the $n_{th}$ period of CLK1, the data determiner 12 executs logic computations on the various input signals applied thereto (as described hereinafter) to obtain a 2-bit code position indication data value D2(n), D1(n) which indicates whether the code position occurred in the sampling period corresponding to that $n^{th}$ CLK1 period, and, if so, the determination time point to which the code position corresponds. A logic computation operation is then executed in the $(n+1)^{th}$ CLK1 period (using delayed signal values obtained during the $n^{th}$ period) to determine if the detected code position should be assigned to that clock period, rather than the $n_{th}$ period, and generating corresponding N2(n+1), N1(n+1) and D2(n+1), D1(n+1) values, as indicated in FIGS. 8(h), 8(i).

The number of determination time points which occur in each CLK1 period, e.g. the $n^{th}$ period, are indicated by the corresponding states of the determination time point number indication data N2(n), N1(n), with the relationships being as shown in FIG. 7(a). The relationships between the code position indication data D2(n), D1(n) and the position to which a code position is assigned by the data determiner circuit 12 are shown in the table of FIG. 7(b). As shown, if D2(n)=0 and D1(n)="1", then a detected code position is assigned to the second determination time point (if there are two determination time points for that CLK1 period), while for the opposite condition of D2(n), D1(n) a detected code position is assigned to the first determination time point. If no code position is assigned to that CLK1 period, then both D2(n), D1(n) are made "0".

As described hereinabove, although normally only one determination time point will occur within each sampling period, there will be some sampling periods in which two determination time points occur, and other in which no determination time points occur. This is illustrated in FIG. 8(f) to (h), in which zero, one and two determination time points are respectively assigned to the (n−1)$^{th}$ period of CLK1. If only a single determination time point occurs within a sampling period it is designated as $d_1$, while if two determination time points occur the first is designated as $d_1$ and the second as $d_2$.

It can thus be understood that the code position indicated by a Det(n) pulse may correspond to either of the determination time points d1(n), d1(n+1) for each of the cases shown in FIG. 8(f), (g) and (h).

Figure 16:
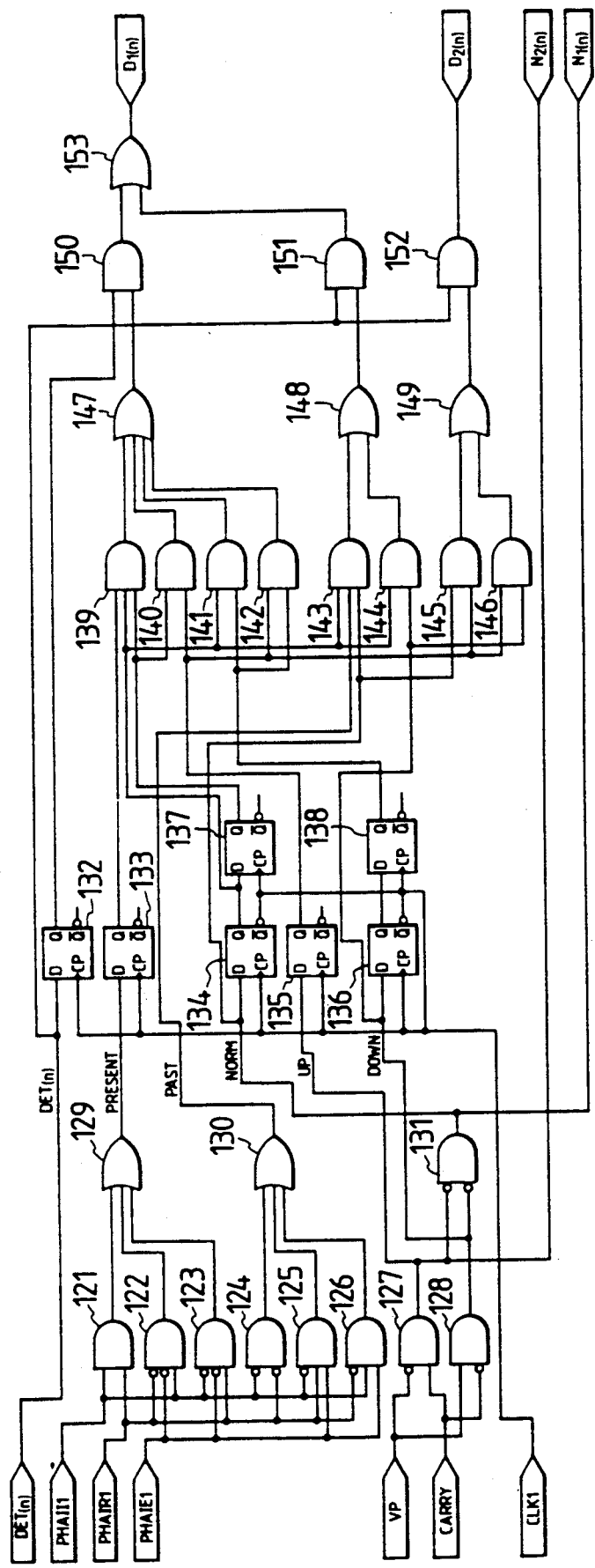
FIG. 16 is a detailed circuit diagram of a data determiner in the embodiment of FIG. 4.

The data determiner circuit 12 derives the values of N2, N1 and D1, D2 for each processing clock CLK1 period based on the values of $\phi_i$, $\phi_e$, $\phi_r$, $\phi_r$, Vp, and Carry that are inputted for that period, together with the state of Det(n) obtained during both that period and the immediately preceding period (since Det(n) remains at the "1" level during only one period). One-bit signals named Norm, Up, Down, Present and Past (described hereinafter) are generated within the data determiner circuit 12 in accordance with these inputs, and these signals are utilized to establish the values of N2, N1, and D1, D2. The relationships between these signals during two successive CLK1 processing clock periods, i.e. periods n and (n+1), are shown in the table of FIG. 9, in which it is assumed that the output Det(n) from the code position detection circuit 4 goes to the "1" level during the $n^{th}$ CLK1 period, which indicates that a code position is to be assigned to either the (n)$^{th}$ or the (n+1)n$^{th}$ period of CLK1. In the two left-side columns of signal names (Norm, etc), if a signal name occurs, then the "1" state of the signal is indicated. Thus for example the first row of the table indicates: "during the $n^{th}$ CLK1 period, with signal Det(n) at the "1" level, if signal Norm(n−1) is at the "1" state, signal Norm(n) is in the "0" state, signals N2(n) and N1(n) were produced at the "0" and "1" levels respectively during the preceding CLK1 period, and are being produced at the "0" and "1" levels respectively during the current (i.e. n$^{th}$) CLK1 period, and signals Present(n) and Past(n) are respectively at the "0" and "1" states, then there is one determination time point assigned to each of the n$^{th}$ and (n+1)$^{th}$ CLK1 periods, and the detected code position is assigned to the determination time point of the n$^{th}$ (i.e. current) period of CLK1." FIG. 16 is a circuit diagram of the data determiner circuit 12 (described hereinafter), showing the various signals of FIG. 9, and it can be understood that during the n$^{th}$ CLK1 period, the states of signal N1(n) and N2(n) during the (n−1)$^{th}$ period are produced from data type flip-flops 134, 135 respectively, thereby making the above determination possible.

In the following, a "." symbol within a logic equation represents the AND operation, while a "+" symbol indicates the OR operation.

The signals Up, Down, Norm, N1, N2, are computed by the data determiner circuit 12 by logic processing based on the following equations. It has been found possible to simplify the operation by utilizing only the MSBs of each of the input phase $\phi_i$, phase error $\phi_e$, and reproduced clock phase $\phi_r$, these MSBs being respectively designated as $\phi_i'$, $\phi_e'$ and $\phi_r'$.

Up(n) = Vp(n)·Carry(n)

Down(n) = Vp(n)·Carry(n)

Norm(n) = Up(n)·Down(n)　　　　　　　　(7)

If the number of determination time points within a clock period is 2, then Up(n)="1". If the number is one, then Norm(n)="1". If the number is 0, then Down(n)="1". Thus, the values of N1, N2 are obtained as follows:

$$N1(n) = Up(n) \cdot Down(n)$$

$$N2(n) = Up(n) \tag{8}$$

In addition, $$Present(n) = \phi_l(n)' \cdot \phi_r(n)' + \phi_l(n)' \cdot \phi_r \cdot \phi_c(n)' +$$
$$\phi_l(n)' \cdot \phi_r(n)' \cdot \phi_c(n)' \tag{9}$$

$$Past(n) = \phi_l(n)' \cdot \phi_r(n)' + \phi_l(n)' \cdot \phi_r(n)' \cdot \phi_c(n)' +$$
$$\phi_l(n)' \cdot \phi_r(n)' \cdot \phi_c(n)'$$

Similarly, the values of D1, D2 are obtained as:

$$D1(n) = Det(n-1) \cdot \{Present(n-1) \cdot Norm(n-2) \cdot \tag{10}$$
$$Norm(n-1) + Norm(n-2) \cdot Up(n-1) + Down(n-2) \cdot$$
$$Norm(n-1) + Down(n-2) \cdot Up(n-1)\} + Det(n) \cdot$$
$$\{Past(n) \cdot Norm(n-1) \cdot Norm(n) + Norm(n-1) \cdot Down(n)\}$$

$$D2(n) = Det(n) \cdot \{Up(n-1) \cdot Norm(n) + Up(n-1) \cdot Down(n)\}$$

The operation of the rate converter circuit 13 is as follows. First, for each of successive expanded periods, each consisting of of a predetermined plurality of successive periods of the processing clock CLK1, the determination time point number indication data for each of the CLK1 periods are combined to obtain determination time point number indication data for the expanded period. Similarly, for each of the expanded periods, the code position indication data for each of the CLK1 periods within that expanded period are combined to obtain code position indication data for the expanded period. Thereafter, for each expanded period, a number of rerproduced clock pulses equal to the number of determination time points expressed by the determination time point number indication data for that period are successively generated, while in parallel with that a number of code bits (in this embodiment, "1" state bits) are produced, the number being expressed by the code position indication data for the expanded period and the code bits being synchronized with specific ones of the clock pulses, as designated by the code position indication data. With a first version of the present embodiment, each expanded period consists of two successive periods of the processing clock CLK1. As described above referring to FIG. 9 there is a maximum of three determination time points and a minimum of one determination time point, and a maximum of one code position, within two successive processing clock periods in the case of a (2,7) RLLC data signal. Thus, either one, two, or three reproduced clock pulses and zero or one "1" code bits will be generated by the rate converter circuit 13 during each expanded period.

Figure 11:
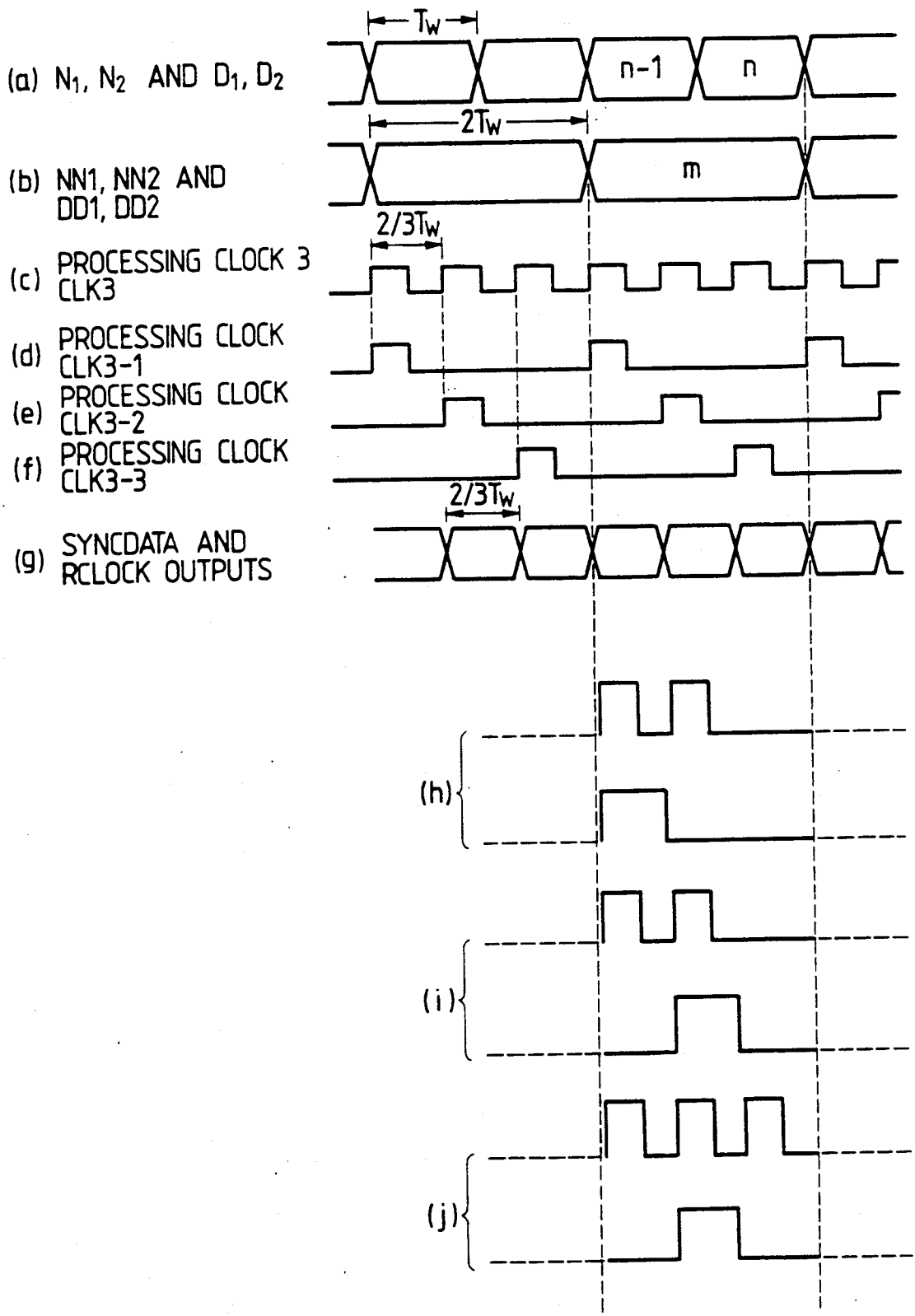

The operation will be described referring first to the timing diagram of FIG. 11. Firstly, the determination time point number indication data N1, N2 for two successive periods of CLK1 (designated as periods n and (n−1), each of duration $T_w$) indicated in FIG. 11(a) are combined, to obtain determination time point number indication data NN1(m), NN2(m) for the corresponding expanded period (designated as period m) indicated in FIG. 11(b). Similarly, the code position indication data D1, D2 for periods n and (n−1) are combined to obtain code position indication data DD1(m), DD2(m) for the expanded period m. The rate converter circuit 13 executes these operations by the following computations:

$$DD1(m) = \{N1(n-1) + N2(n-1)\} \cdot D1(n-1) +$$
$$N2(n-1) \cdot N1(n-1) \cdot D1(n) + N1(n-1) \cdot D1(n) +$$
$$N2(n-1) \cdot D2(n-1) \cdot N1(n-1) \cdot N2(n-1) \cdot N2(n) \cdot D2(n)$$

and, $$DD2(m) = N1(n-1) \cdot D1(n) + N2(n-1) \cdot D2(n-1) +$$
$$N1(n-1) \cdot N2(n-1) \cdot N2(n) \cdot D2(n) +$$
$$N1(n-1) \cdot N2(n-1) \cdot D2(n) + N1(n-1) \cdot N2(n-1) \cdot D1(n)$$

In addition, $$NN1(m) = N1(n-1) \cdot N1(n) + N1(n-1) \cdot N1(n)$$
$$= N1(n-1) \oplus N1(n)$$
$$NN2(m) = N1(n-1) \cdot N1(n) + N2(n-1) + N2(n)$$

In the above, the $\oplus$ symbol indicates the exclusive-OR operation.

Figure 17:
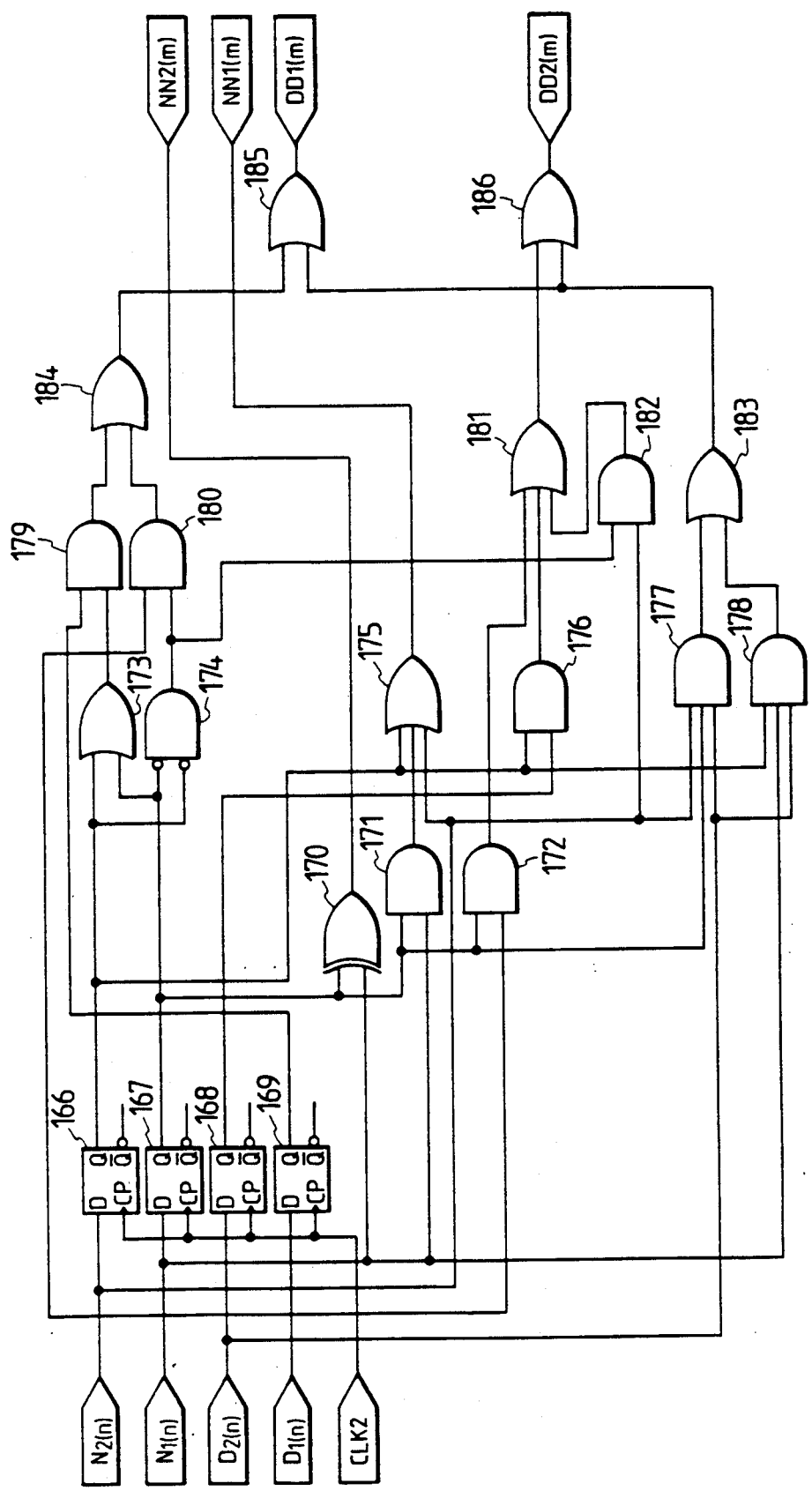
FIG. 17 is a detailed circuit diagram of a input portion of a rate converter circuit in the embodiment of FIG. 4.

Logic processing corresponding to the above equations is executed by the rate converter circuit portion shown in FIG. 17. The value N1(n−1) for example, i.e. the value of data signal N1(n) in the preceding clock period, is obtained from the output of a D-FF 167, N2(n−1) from the D-FF 166, and so on.

Figure 10:
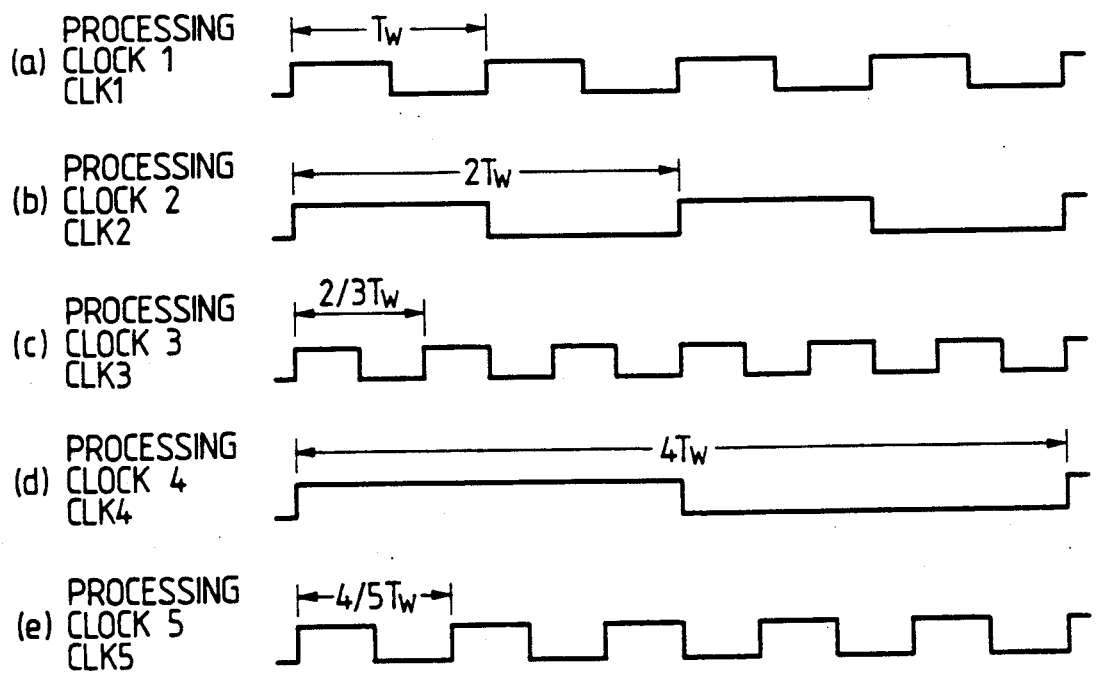
FIGS. 10 and 11 are timing diagrams for describing the operation of a rate converter circuit in the embodiment of FIG. 4.

The values of DD1(m), DD2(m), NN1(m) and NN2(m) thus obtained are then combined with three new processing clock signals CLK3, CLK3-1, CLK3-2, generated from the clock signal generating circuit 18, which are shown in FIG. 11(c) to (f) respectively, to obtain the detected data output Syncdata and reproduced clock output Rclock. The processing clock signals CLK2 (which defines the aforementioned expanded periods) and CLK3 are derived from processing clock CLK1 as illustrated in FIG. 10(a) to (c). As shown, the period of CLK3 is ⅔ that of CLK1, i.e. is (⅔) $T_w$, while that of CLK2 is $2T_w$. The processing clock signals CLK3-1, CLK3-2, and CLK3-2 each have a period of $2T_w$, a pulse width of (⅓) $T_w$, and successively differ in phase by (⅔) $T_w$ as shown in FIG. 11. The rate converter circuit 13 executes the following computations to derive Syncdata and Rclock:

Syncdata = $DD1(m) \cdot DD2(m) \cdot CLK_{3-3} + DD1(m) \cdot DD2(m) \cdot CLK_{3-2} + DD1(m) \cdot DD2(m) \cdot CLK_{3-1}$ $NN1(m) = NN1(m) \cdot NN2(m) \cdot CLK_{3-2} + NN2(m) \cdot CLK_{3-2} + CLK_{3-1}$ (12)

Figure 18:
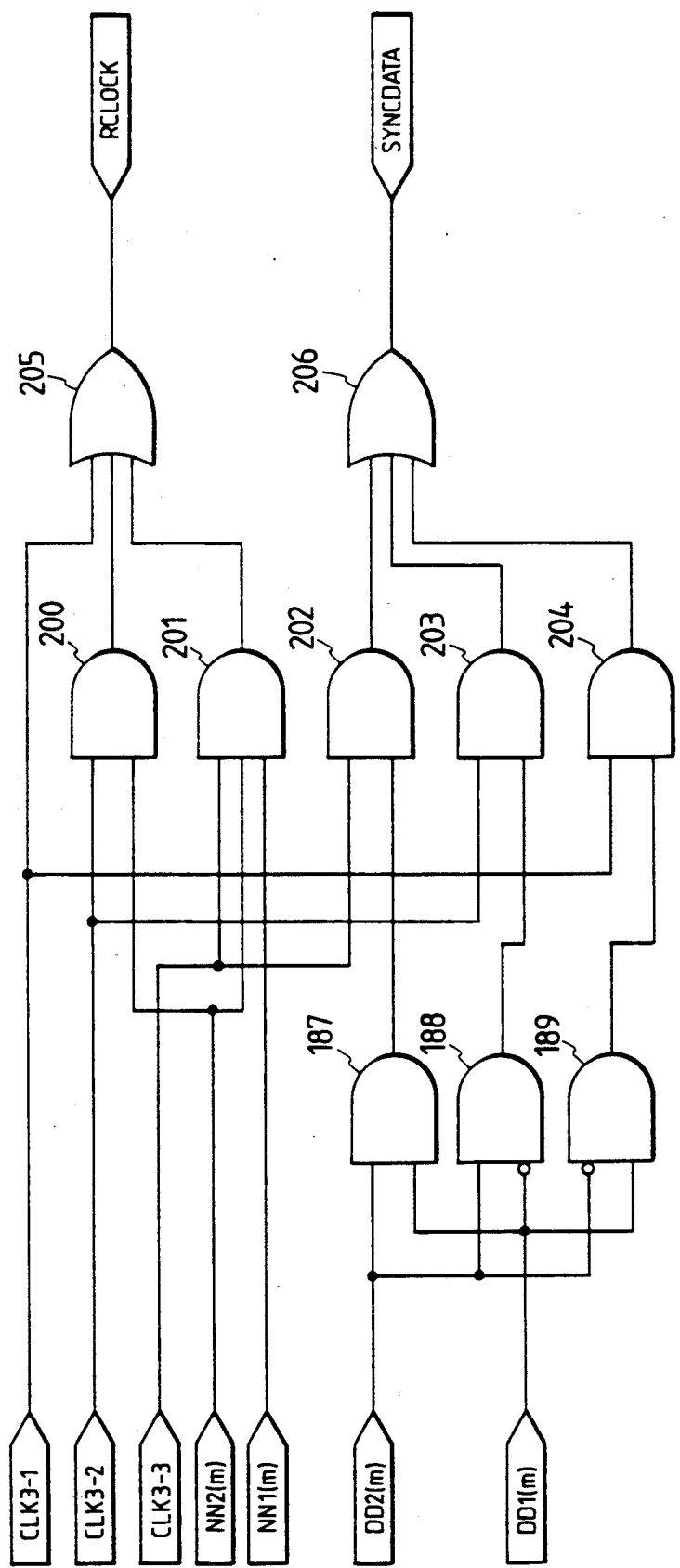
FIG. 18 is a detailed circuit diagram of a first example of an output portion of a rate converter circuit in the embodiment of FIG. 4.

Logic operations in accordance with the above equations are executed by the rate converter circuit portion shown in FIG. 18.

FIG. 11(h) shows an example of the outputs produced from this version of the rate converter circuit 13 during one expanded period, indicated as period m in FIG. 11(a), in which the determination time point number indication data and code position indication data of the periods (n−1) and n of CLK1 have been combined as described above. FIG. 11(h) shows the Rclock (upper waveform) and Syncdata (lower waveform) for period m for the case in which the determination time point number indication data and code position indication data of periods (n−1) and n of CLK1 represent the condition shown in the uppermost row of the table in FIG. 9. That is, there is one determination time point in each of periods (n−1) and n, and there is one code position assigned to period n. As a result, based on the combined data DD1(m), DD2(m) and NN1(m), NN2(m), the rate converter circuit 13 will produce two pulses of Rclock, and one "1" state bit that is synchronized with the first Rclock pulse. Similarly, FIG. 11(i) shows the shows the Rclock (upper waveform) and Syncdata (lower waveform) outputs from the rate converter circuit 13 for period m, for the case in which the determination time point number indication data and code position indication data of periods (n−1) and n of CLK1 represent the condition shown in the second row of the table in FIG. 9, and FIG. 11(j) shows the corresponding Rclock and Syncdata outputs for the condition shown in the third row in FIG. 9.

It can be understood from the above description that the Syncdata of period m in the example of FIG. 11(h) represents the bit sequence "1" "0", that of FIG. 11(i) represents "0" "1", and that of FIG. 11(j) represents "0" "1" "0". As can be understood from FIG. 9, the Syncdata output during one expanded period may consist of a total of one, two, or three successive bits. Normally, there will be two bits, since each sampling period normally contains one bit position as described hereinabove.

It can thus be understood that with this version of the first embodiment, the determination time point number indication data and code position indication data for each of successive pairs of periods of CLK1 (which respectively correspond to successive pairs of sampling periods in this embodiment) are combined to obtain determination time point number indication data and code position indication data for an expanded period consisting of two periods of CLK1, and then during that expanded period a number of Rclock pulses are generated as designated by the determination time point number indication data of the expanded period, with a clock period which is $\frac{2}{3}$ times the bit separation of the input signal $S_i$. During the same expanded period, no more than one "1" state bit that is synchronized with an appropriate one of the Rclock pulses is outputted as the Syncdata output. This is successively executed for consecutive pairs of CLK1 periods, to produce Rclock and Syncdata as respective serial digital signals. The period of successive Rclock pulses is $(\frac{2}{3}) T_w$.

In the version of the rate converter circuit 13 of the first embodiment described above, each expanded period consists of two periods of processing clock CLK1 (i.e. two sampling periods). However, the invention is not limited to such a number, and in general a number N of successive sampling periods can be combined as a single expanded period, in which case the period of successive Rclock pulses is $N \times T_w / (N+1)$.

A second version of the rate converter circuit 13 will be described, in which N is equal to 4, and the period of successive Rclock pulses is $(4/5) T_w$. FIG. 10(d) illustrates how a processing clock CLK4 with period $4T_w$ is derived from processing clock CLK1, and then a processing clock CLK5 having a period of $(4/5) T_w$ is derived using CLK4. In this case, in a similar way to that shown in FIG. 11, a set of four processing clock clock signals CLK4-1 to CLK5 (not shown in the drawings) are generated, each having a period of $4T_w$ and mutually differing in phase by $(4/5) T_w$. By executing logical operations which are in principle similar to those described above for the first version of the rate converter circuit 13 (but are substantially more complex), values of combined determination time point number indication data and code position indication data for each expanded period consisting of four successive sampling periods can be obtained. That data is then used to generate the requisite number of Rclock pulses during each expanded period, together with the appropriate number and positions of "1" state bits as Syncdata. In that case the period of successive Rclock pulses will be $(4/5) T_w$.

It can thus be understood that either of the above versions of the rate converter circuit will provide a substantially lower bit rate for the serial output signals obtained, than would be the case if each bit pair D1, D2 and N1, N2 were directly converted from parallel to serial form. If such direct conversion were executed, then the period of successive Rclock bits would be 0.5 times $T_w$. With the second version of the rate converter circuit 13 described above, that period is 0.8 times $T_w$. Thus, a rate converter circuit according to the first embodiment enables the bit rate of the reproduced clock and detected data signals to be lowered.

Figure 12:
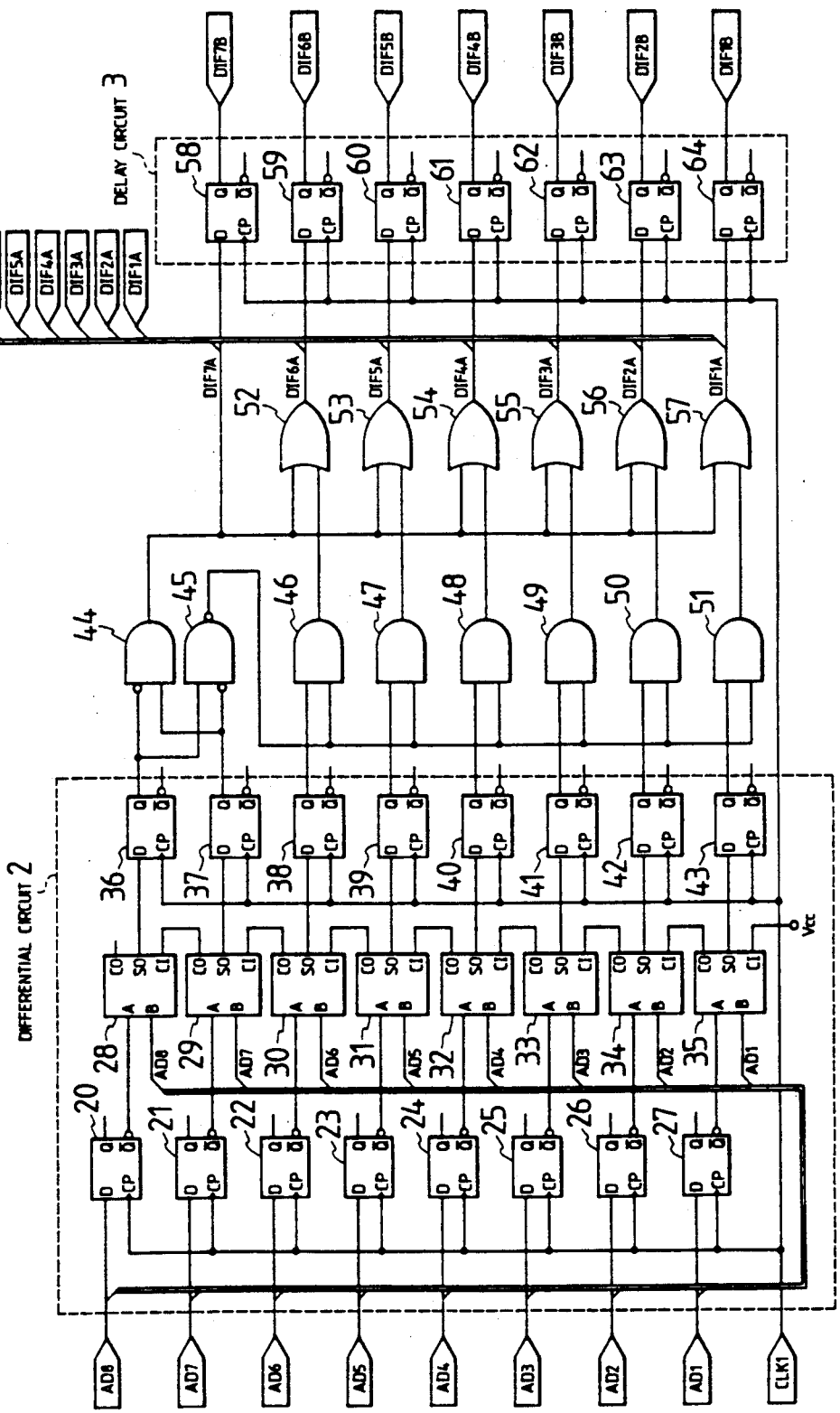
FIG. 12 is a detailed circuit diagram of a differential circuit and delay circuit in the embodiment of FIG. 4.

FIG. 12 is a circuit diagram of the differential circuit 2 and delay circuit 3 of the embodiment of FIG. 4. The A/D converter 1 generates successive sample values as 8-bit parallel data, designated AD1 to AD8, A set of adders 28 to 35 are connected to form an 8-bit subtractor (since the "carry input" of adder 35 for the LSB is connected to the "1" level). Numerals 20 to 27, 36 to 43, and 58 to 64 denote respective data-type flip-flops (abbreviated in the following to D-FFs), each of which operates from the processing clock CLK1 as a clock signal to provide a delay of $T_w$. 44 to 51 are AND gates, and 52 to 57 OR gates. A direct 8-bit differential value is obtained as DIF1A to DIF7A, and a 1-period delayed difference value as DIF1B to DIF7B.

Figure 13:
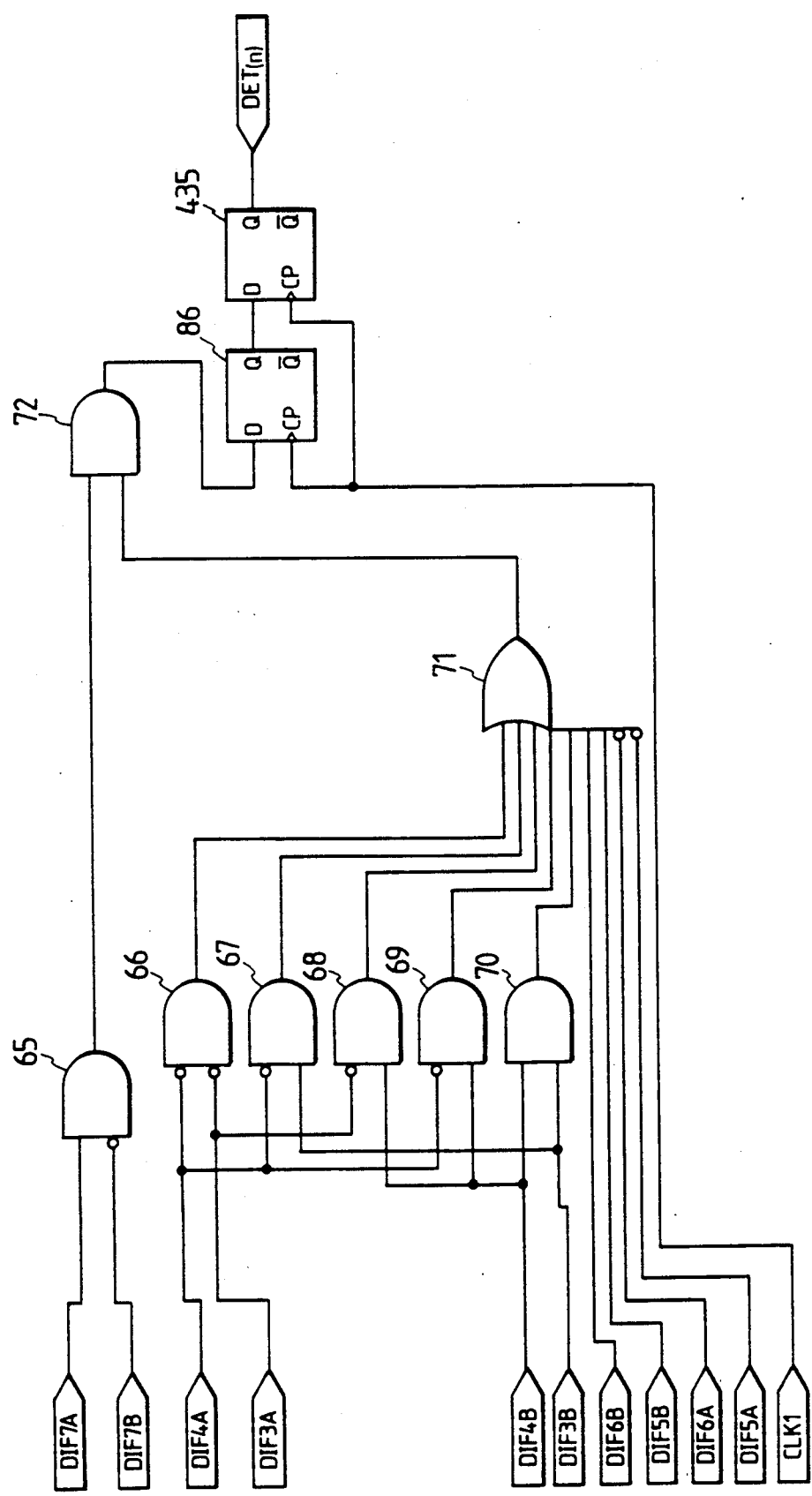
FIG. 13 is a detailed circuit diagram of a code position detection circuit in the embodiment of FIG. 4.

FIG. 13 is a circuit diagram of the code position detection circuit 4 of the embodiment of FIG. 4. Numerals 65 to 70 and 72 denote 2-input AND gates, and numeral 71 a 9-input OR gate. 86a, 86b denote D-FFs which provide a 2-period delay of a "1" state output from AND gate 72 which indicates detection of a code position, with the delayed detection signal being designated as Det(n).

Figure 14:
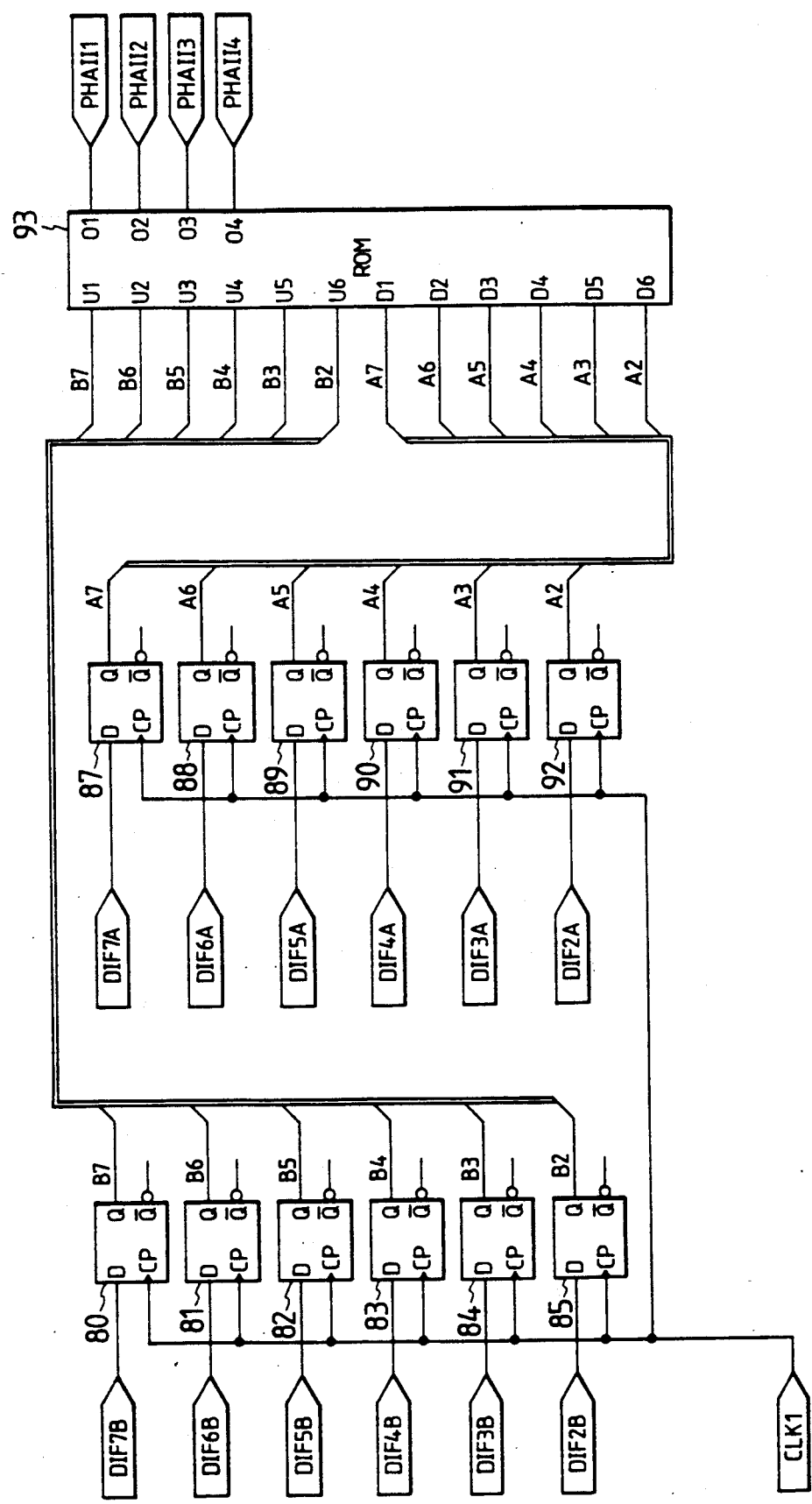
FIG. 14 is a detailed circuit diagram of a phase calculator circuit in the embodiment of FIG. 4.

FIG. 14 is a circuit diagram of the phase calculator circuit 5 of the embodiment of FIG. 4. Numerals 80 to 92 denote D-FFs, and numeral 93 a ROM (read only memory). Input 6-bit difference values A2 to A7 and B2 to B7 are supplied as address inputs to the ROM 93, which is programmed to provide corresponding output 4-bit data values representing the input phase $\phi_i$, described hereinabove, for each combination of two difference values.

Figure 15:
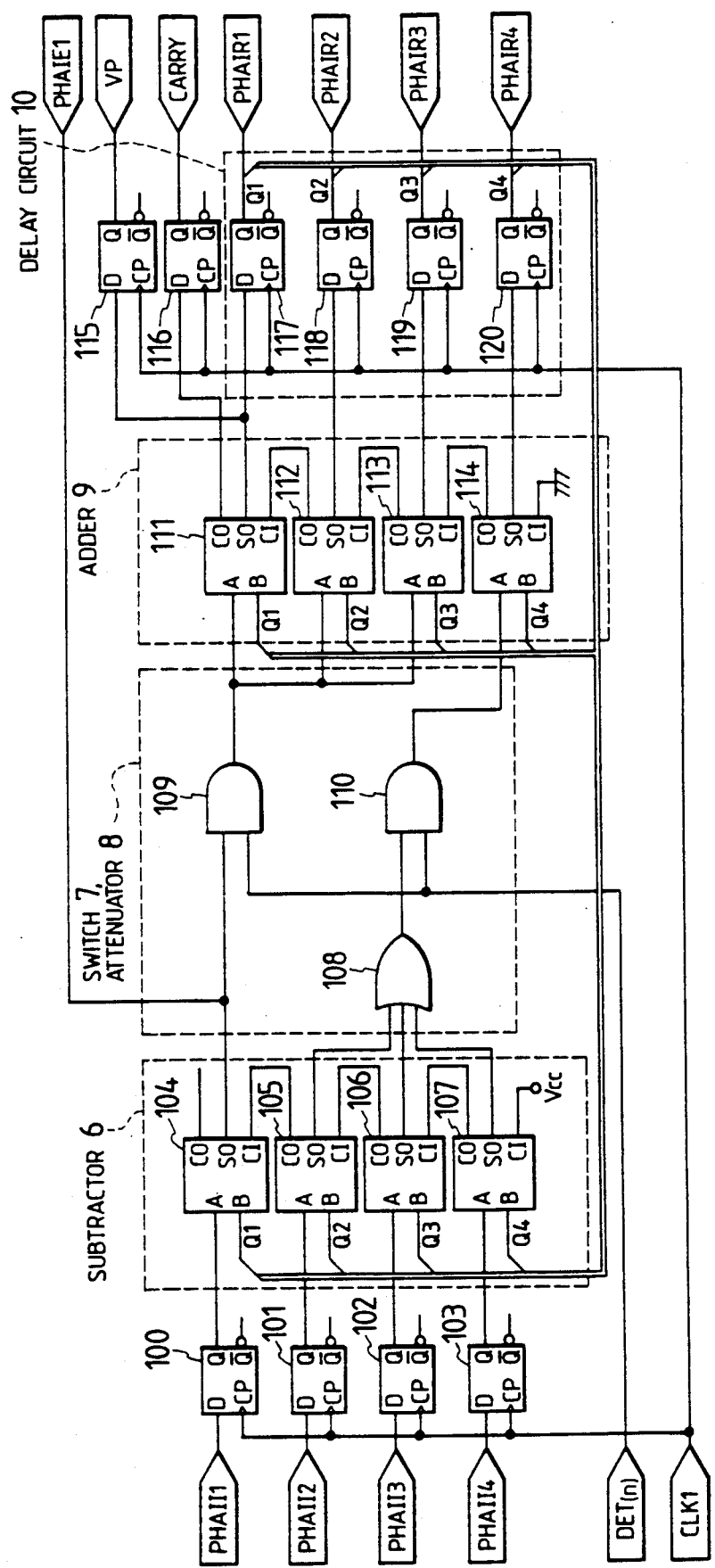
FIG. 15 is a detailed circuit diagram of a digital phase locked loop circuit circuit in the embodiment of FIG. 4.

FIG. 15 is a circuit diagram of the digital PLL circuit 11 of the embodiment of FIG. 4. Numerals 100 to 103 and 115 to 120 denote D-FFs, while numerals 104 to 107 and 111 to 114 denote adders, 108 is a 3-input OR gate, and 109, 110 are 2-input AND gates. Adders 104 to 107 are connected to function as a 4-bit subtractor, adders 111 to 114 form a 4-bit full adder. AND gates 109, 110 are controlled by the Det(n) signal, to function as switch 7 shown in FIG. 4. It can be understood that the signal designated Carry is delayed by one CLK1 period relative to the carry output produced from the adder 9, and that the signal Vp is similarly delayed relative to the MSB output from the adder 9. Vp and Carry in combination can thereby be used (for producing signals Down and Up) to determine whether a condition of zero determination time points or of two determination time points is to be assigned to the current processing period (i.e. $n^{th}$ CLK1 period) of the data determiner circuit of FIG. 16 described below.

FIG. 16 is a circuit diagram of the data determiner circuit 12 of the embodiment of FIG. 4. Numerals 121, 124, 127, 128, 131, 140 to 146, 150 to 152 denote 2-input AND gates. 122, 123, 125, 126, 139, 143 denote 3-input AND gates. 129, 130 are 3-input OR gates. 132 to 138 are D-FFs. 147 is a 4-input OR gate, and 148, 149, 153 are 2-input OR gates. It can be understood from FIG. 16 that the Det(n) signal from the code position detection circuit 4, although only continuing during a first $T_w$ period in which it controls the AND gates 151, 152, is also available to control AND gate 150 during the succeeding $T_w$ period, as Det(n−1), due to the delay provided by D-FF 132. That first $T_w$ period corresponds to the period n of FIG. 5, while the succeeding period corresponds to period (n+1) in FIG. 8. Thus, during period (n) either (or neither) of D1 and D2 may go to the "1" level, However during period (n+1), only output D1 can go to the "1" level. This is therefore in agreement with the contents of FIGS. 7(a), 7(b) and 9. The respective MSBs of the input phase $\phi_i$, the phase error $\phi_e$, and the reproduced clock phase $\phi_r$ are designated as PHAII1, PHAIE1 and PHAIR1. The origins of the signals Past, Present, Norm, Up and Down, referred to hereinabove, will also be apparent from FIG. 16.

FIG. 17 is a circuit diagram of an input portion of the first version of the rate converter circuit 13 of the embodiment of FIG. 4, which converts data values D1, D2 and N1, N2, with period $1/T_w$ to data values DD1, DD2 and NN1, NN2 which have a period of $2/T_w$. Numerals 166 to 169 denote D-FFs, 173, 175, 181, and 184 to 186 are OR gates, 171, 172, 174, 176 to 180, and 182 are AND gates. 170 is an exclusive-OR gate.

FIG. 18 is a circuit diagram of the remaining portion of the first version of the rate converter circuit 13, which converts data values NN1, NN2, and DD1, DD2 from parallel to serial data form, to produce the Rclock and Syncdata outputs described hereinabove, with the Rclock period being $(\frac{2}{3}) T_w$.

Figure 19:
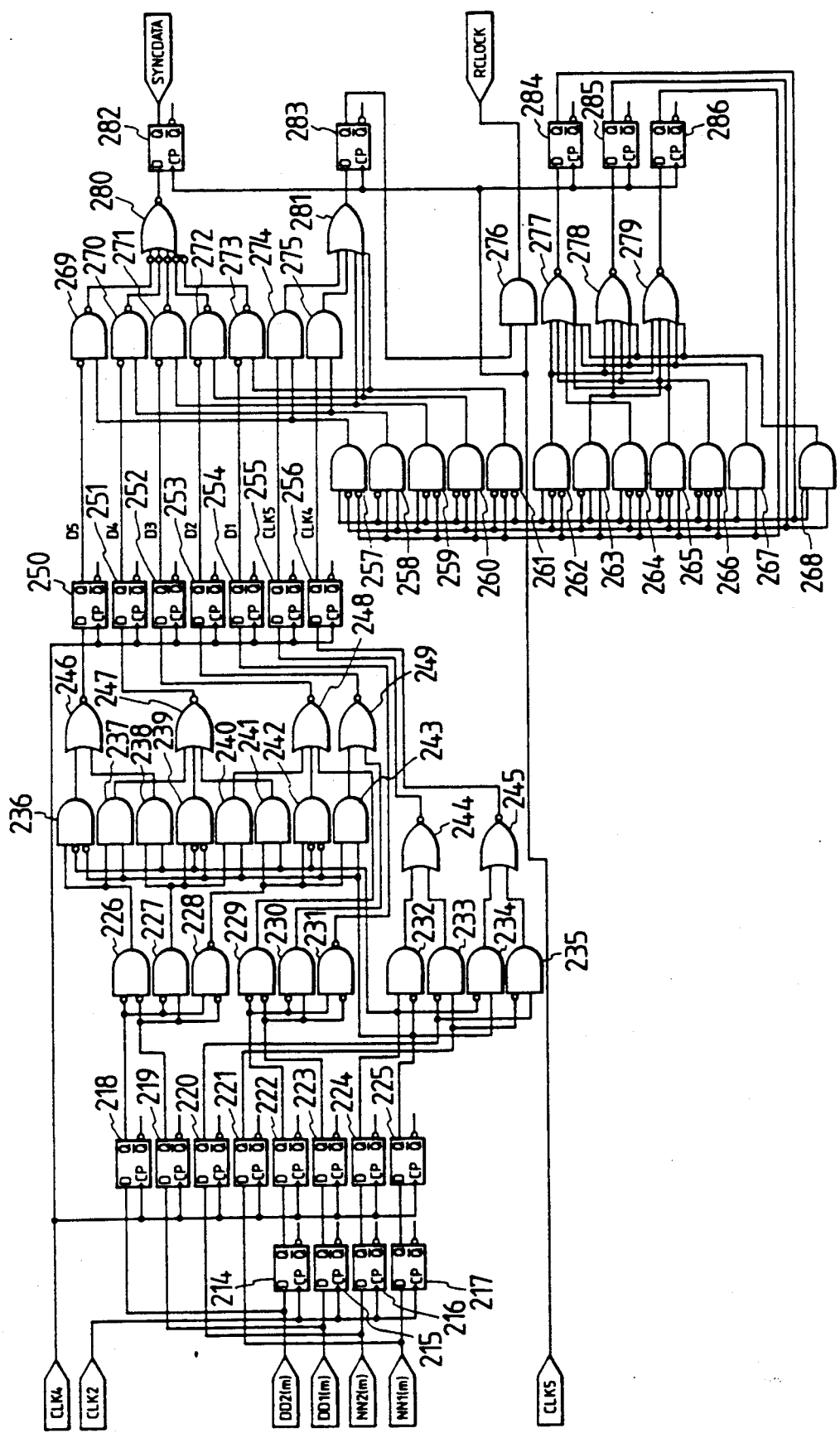
FIG. 19 is a detailed circuit diagram of a second example of an output portion of a rate converter circuit in the embodiment of FIG. 4.

FIG. 19 is a circuit diagram of a portion of the second version of the rate converter circuit 13 described above, which produces an Rclock output with a (4/5) $T_w$ period. The circuit of the first portion of that version of the rate converter circuit 13, which combines the determination time point number indication data and code position indication data for four successive sampling periods to obtain the determination time point number indication data NN1(m), NN2(m) and code position indication data DD1(m), DD2(m) (respectively inputted to the circuit of FIG. 19) for an expanded period of duration $4T_w$, is not shown in the drawings.

Figure 20:
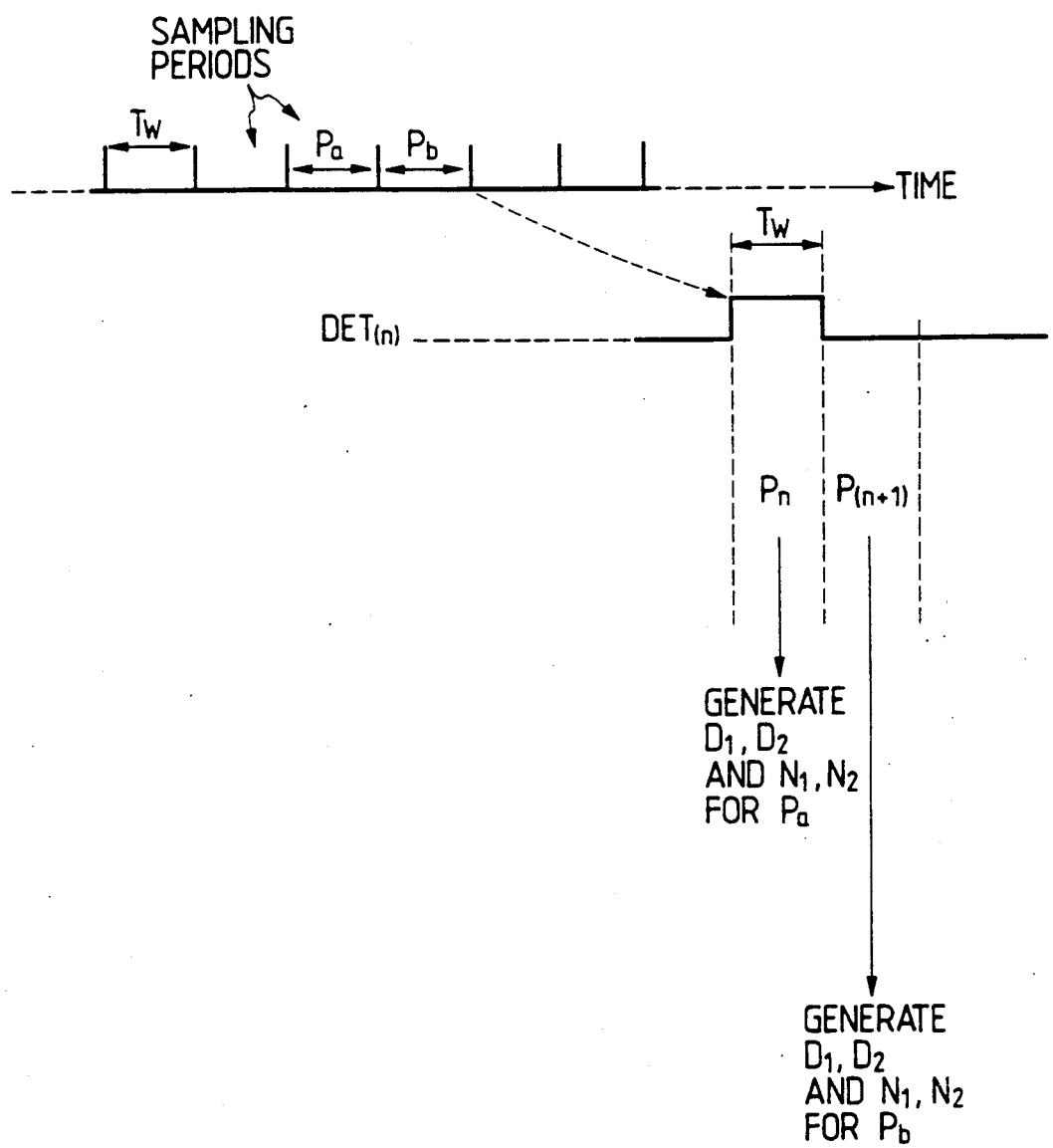
FIG. 20 is a conceptual timing diagram for summarizing the basic principles of the first embodiment.

From the above it can be understood that the basic principles of operation of the first embodiment are as follows, referring to the conceptual timing diagram of FIG. 20. If the signal Det(n) goes to the "1" level during a period $P_n$ of the processing clock CLK1, then this indicates that a code position has occurred during either of two specific consecutive sampling periods of the input signal $S_i$, which will be designated as $P_a$, $P_b$. Based on the values of the MSBs of the input phase $\phi_i$, phase error $\phi_e$, reproduced clock phase $\phi_r$ and the Carry bit, the data determiner circuit 12 generates a a set of one-bit signals Present, Past, Norm, Up, Down during the $n^{th}$ CLK1 clock period. Based on the the values of these and on values of these signals obtained during one or more preceding clock periods (designated as Present(n−1), etc), together with the "1" state of Det(n), a combination of values of D1, D2 is produced which indicates whether or not the code position is to be assigned to CLK1 period $P_n$ (corresponding to $P_a$) and the relationship of that code position to the determination time points assigned to $P_n$ (if there are two bit positions within $P_a$). If it is found that the code position has occurred within the second sampling period $P_b$ rather than $P_a$, then D1, D2 are both outputted at the "0" level during clock period $P_n$, and during the next clock period $P_{(n+1)}$ of CLK1 a combination of states of D1, D2 is produced from the data determiner circuit 12 which indicates that a code position is assigned to period $P(n+1)$. In that case, there is only one possible determination position in $P(n+1)$ for the code position (i.e. dl(n+1) as shown in FIG. 9), even if two determination time points are assigned to period $P_{n+1}$. In addition, irrespective of the state of the Det(n) signal during period $P_n$, values of N1(n), N2(n) are generated in that period based on the states of Carry and Vp.

Thus with the first embodiment, a pair of one-bit values D1, D2 are obtained for each sampling period of the input signal $S_i$, and all circuit operations are synchronized with the processing clock CLK1, whose periods constitute the sampling periods. A second embodiment will now be described which has the advantage of enabling all processing operations, other than sampling the input signal $S_i$ with a sampling period $T_w$, to be executed using a processing clock CLK2 having a period of $2T_w$. This is highly advantageous if the bit rate of the input signal $S_i$ is high, since the circuit performance requirements are substantially relaxed. With this second embodiment, rather than deriving determination time point number indication data and code position indication data values for respective sampling periods of the input signal $S_i$, these values are obtained for each of successive pairs of sampling periods. The basic principles of this second embodiment are illustrated in the conceptual timing diagram of FIG. 21. Designating a set of four successive sampling periods of the input signal $S_i$ as $P_a$ to $P_d$, which constitute two successive pairs of sampling periods $P_{ab}$, $P_{cd}$, if the code position detection circuit 4 detects (based on successive pairs of difference values of the input signal $S_i$, as described for the first embodiment) that a code position has occurred during the pair of sampling periods $P_b$, $P_c$, then a front code position detection signal Fpeak goes to the "1" level during a period $P_n$ of processing clock CLK2. If on the other hand it is detected that a code position has occurred during sampling periods $P_c$ or $P_d$, then a rear code position detection signal Rpeak goes to the "1" level during period $P_n$. There can be up to three determination time points in two successive sampling periods, and determination time point number indication data expressing the appropriate number, together with code position indication data expressing the determination position of any code position, are generated for each of successive pairs of sampling periods such as $P_n$, based on the states of Fpeak and Rpeak obtained for that pair of sampling periods in conjunction with the other digital values $\phi_i'$, $\phi_e'$, $\phi_r'$, and Carry that are utilized by the data determiner circuit 12. As in the first embodiment, the code position indication data indicate whether a code position is assigned to within the period $P_n$ or $P_{n+1}$, and the determination time point within that period to which the code position corresponds.

It can be understood that generation of the Fpeak pulse during period $P_n$ indicates that a peak of the input signal has occurred during either the sampling period pair $P_{ab}$ or $P_{cd}$, whereas generation of the Rpeak pulse during $P_{n+1}$ unambiguously indicates that a peak has occurred during $P_{cd}$.

Figure 21:
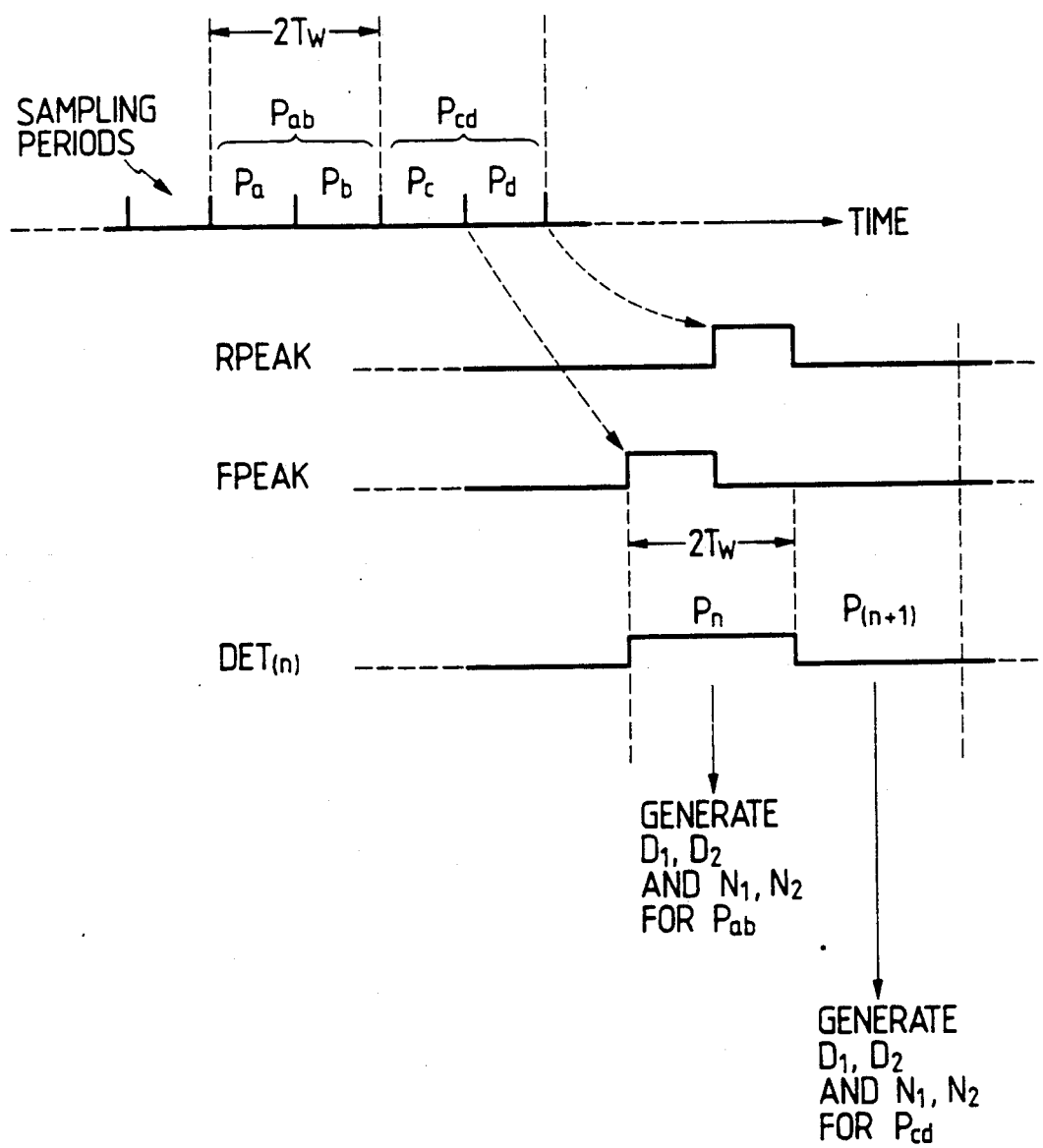
FIG. 21 is a conceptual timing diagram for summarizing the basic principles of a second embodiment of the invention.

Although Rpeak and Fpeak are both shown in FIG. 21 for illustration, the circuit is configured such that it is not possible for both of these to occur together.

Figure 22:
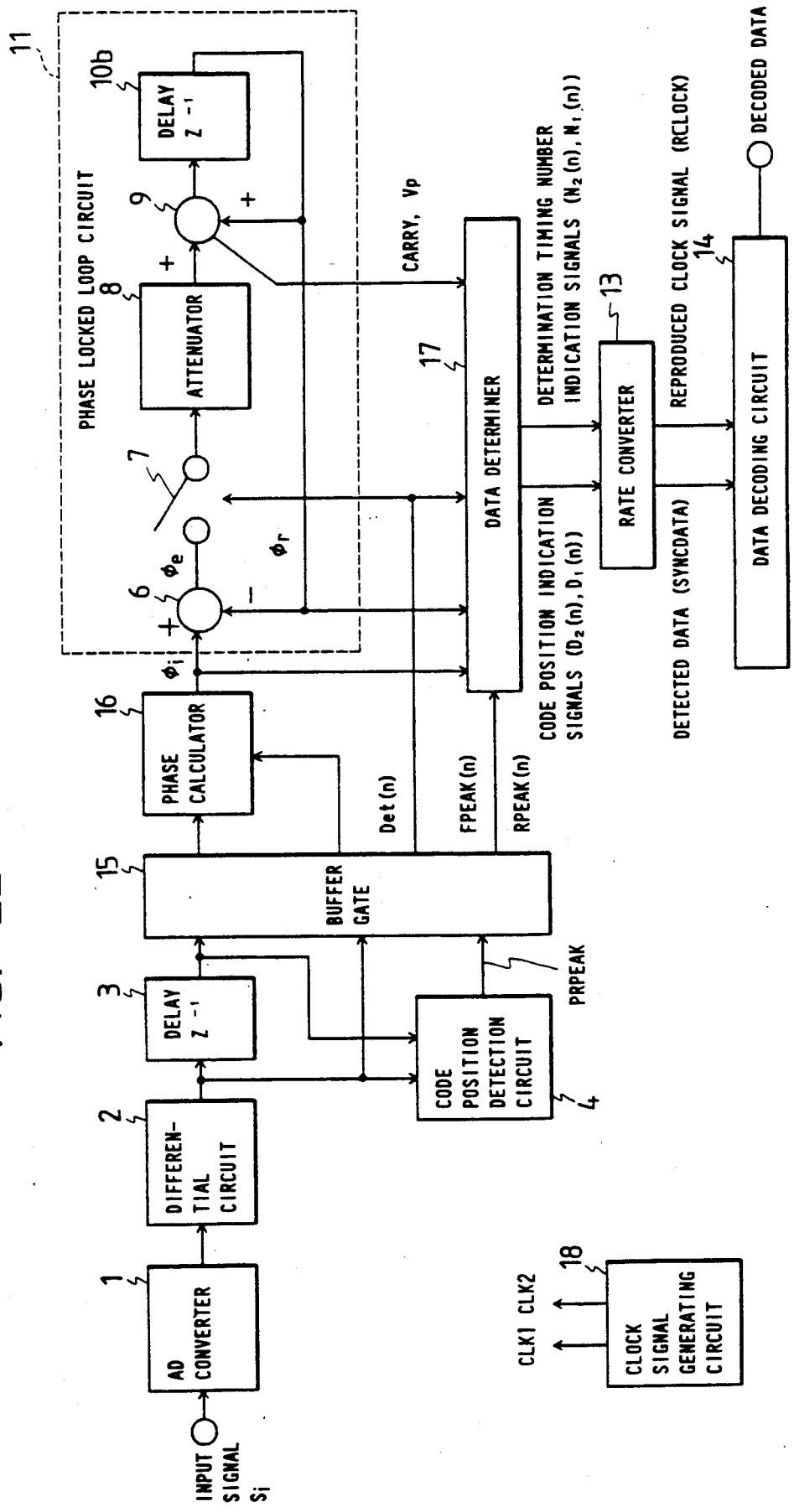
FIG. 22 is a block diagram showing the general configuration of the second embodiment.
Figure 23:
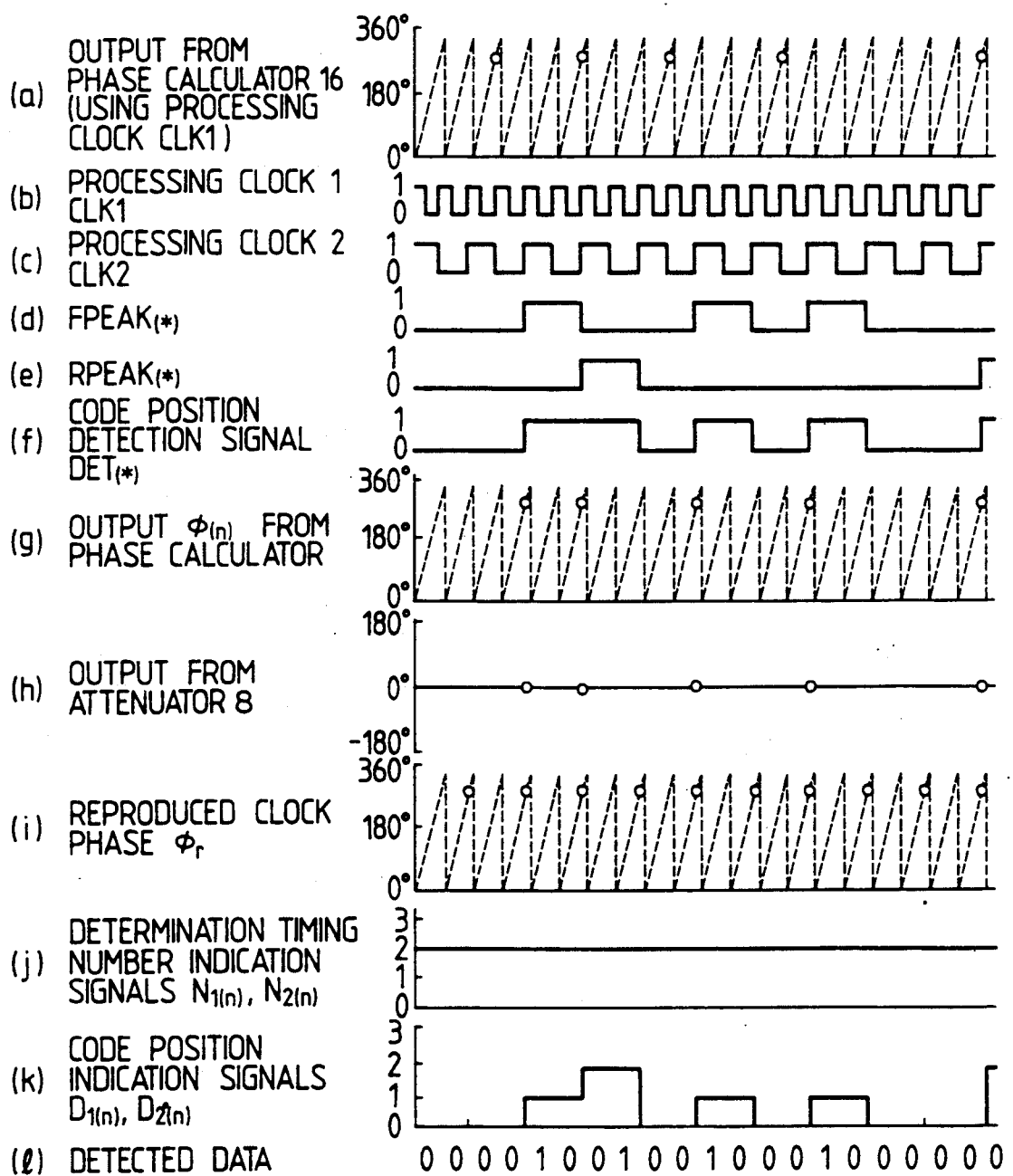
FIG. 23 is a timing diagram for describing the basic operation of the embodiment of FIG. 22 as applied to a specific portion of a (2, 7) RLLC NRZ input signal $S_i$.

The general configuration of the second embodiment is shown in FIG. 22. This is basically similar to the first embodiment, and receives a (2,7) RLLC NRZ signal as input, but differs in that a buffer gate 15 is included, and also in that the internal configurations of the phase calculator 16 and data determiner 17 differ from those of the first embodiment. One function of the buffer gate circuit 15 is, if the code position detection circuit 4 detects that a code position has occurred, to hold the corresponding difference values during two successive periods of CLK1, so that the corresponding value of input phase $\phi_i$ produced from the phase calculator circuit 16 will be held constant during that time. Another function is to produce the front code position detection signal Fpeak or rear code position detection signal Rpeak, in response to a "1" state pulse of output Prpeak from the code position detection circuit 4 (produced from the output of AND gate 72 shown in FIG. 13), and the internal configuration of the data determiner 17. FIG. 23 shows an example of operating timings for a specific bit sequence of the input signal $S_i$. A processing clock CLK2 is derived from CLK1, and has a period of 2Tw. The digital PLL circuit 11, rate converter circuit 13 and data decoding circuit 14 of this embodiment differ only from the corresponding units of the first embodiment in that they operate based on the processing clock CLK2, rather than CLK1. Since up to a maximum of three determination time points can occur within two successive sampling periods, the code position indication data D1(n), D2(n) can express four different values from 0 to 3.

The table of FIG. 24 shows the relationship between the states of the determination time point number indication data for two successive sampling periods (one period of CLK2) and the corresponding numbers of determination time points represented by the data. FIG. 25 similarly shows the relationship between the states of the code position indication data for one period of CLK2 and the corresponding indication of absence of a code position within that period or of the determination position of a code position which is assigned to the period. The table assumes that there is a total of three determination time points assigned to the CLK2 period. If there are only two determination time points assigned, then the rightmost column and lowest row of the table are not relevant. If there is only one determination time point assigned to the CLK2 period, then only the "0" "0" and "0" "1" combinations of D2, D1 are relevant, and respectively indicate the presence or absence of a code position for that determination time point.

FIG. 26 is a timing diagram for further describing the operation of the second embodiment, in conjunction with the table of FIG. 27. In this embodiment, the Det(n) signal is obtained as the OR function of Fpeak and Rpeak, and so is produced at the "1" state for one period of CLK2 after a code position has been detected. As shown in FIG. 26(e) and (f), the determination time point number indication data and code position indication data each are generated during one period of CLK2.

The symbols used in FIG. 27 are identical to those of FIG. 9 described above. The three possible determination time points which can be assigned to the $n^{th}$ CLK2 period are designated as d1(n), d2(n) and d3(n), while the corresponding positions for the succeeding CLK2 period are designated as d1(n+1), d2(n+1) and d3(n−1). It can be seen that either one, two or three determination time points can be assigned to one CLK2 period, although of course normally two will occur. The determination time point positions d1(n), d2(n) and d3(n), and the possible positions to which a "1" code be assigned to these in FIG. 27, correspond to the period Pab shown in FIG. 21 described above, while d1(n+1), d2(n+1) and d3(n+1) correspond to the second sampling period Pcd in FIG. 21.

The data determiner 17 derives the determination time point number indication data N1(n), N2(n) for each period of CLK2 based on the formulae (8) given hereinabove for the first embodiment, and executes the following logic processing to derive values for the code position indication data D1(n), D2(n):

$$D1(n) = F\text{peak}(n - 1) \cdot \{\text{Present}(n - 1) \cdot \text{Norm}(n - 2) \cdot \quad (14)$$

$$\text{Norm}(n - 1) + \text{Norm}(n - 2) \cdot \text{Up}(n - 1) + \text{Down}(n - 2) \cdot$$

$$\text{Norm}(n - 1) + \text{Down}(n - 2) \cdot \text{Up}(n - 1)\} +$$

$$R\text{peak}(n - 1) \cdot \{\text{Past}(n - 1) \cdot \text{Norm}(n - 2) \cdot \text{Norm}(n - 1) +$$

$$\text{Norm}(n - 2) \cdot \text{Down}(n - 1) + \text{Up}(n - 2) \cdot \text{Norm}(n - 1) +$$

$$\text{Up}(n - 2) \cdot \text{Down}(n - 1)\} + F\text{peak}(n) \cdot \{\text{Up}(n - 1) \cdot$$

$$\text{Norm}(n) + \text{Up}(n - 1) \cdot \text{Down}(n)\}$$

$$D2(n) = R\text{peak}(n - 1) \cdot \{\text{Present}(n - 1) \cdot \text{Norm}(n - 2) \cdot$$

$$\text{Norm}(n - 1) + \text{Norm}(n - 2) \cdot \text{Up}(n - 1) + \text{Down}(n - 2) \cdot$$

$$\text{Norm}(n - 1) + \text{Down}(n - 2) \cdot \text{Up}(n - 1)\} +$$

$$F\text{peak}(n) \cdot \{\text{Past}(n) \cdot \text{Norm}(n - 1) \cdot \text{Norm}(n) + \text{Norm}(n - 1) \cdot$$

$$\text{Down}(n)\} + F\text{peak}(n) \cdot \{\text{Up}(n - 1) \cdot$$

$$\text{Norm}(n) + \text{Up}(n - 1) \cdot \text{Down}(n)\}$$

Figure 28:
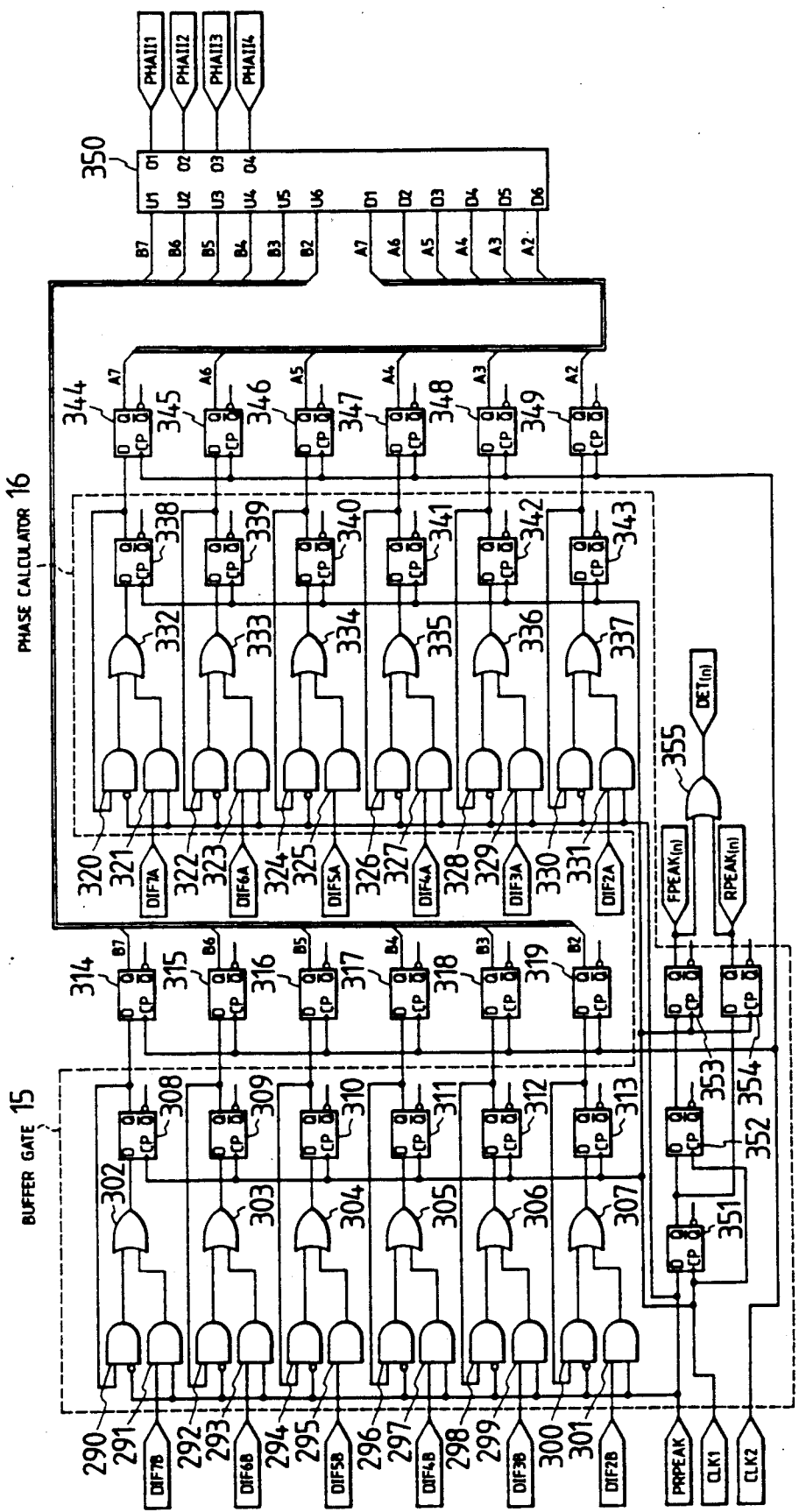
FIG. 28 is a detailed circuit diagram of a buffer gate circuit and phase calculator in the embodiment of FIG. 22.

FIG. 28 is a circuit diagram of the buffer gate 15 and phase calculator 16 of the second embodiment, in which 350 denotes a ROM for producing values of input phase $\phi_i$. It can be understood that if a code position is detected, so that signal Prpeak goes to the "1" level, then the current set of difference values will be latched by the buffer gate 15 for one period of CLK2, so that the value of input phase $\phi_i$ produced from ROM 350 will remain fixed for that period. The operation of the phase calculator 16 is identical to that of the first embodiment.

Figure 29:
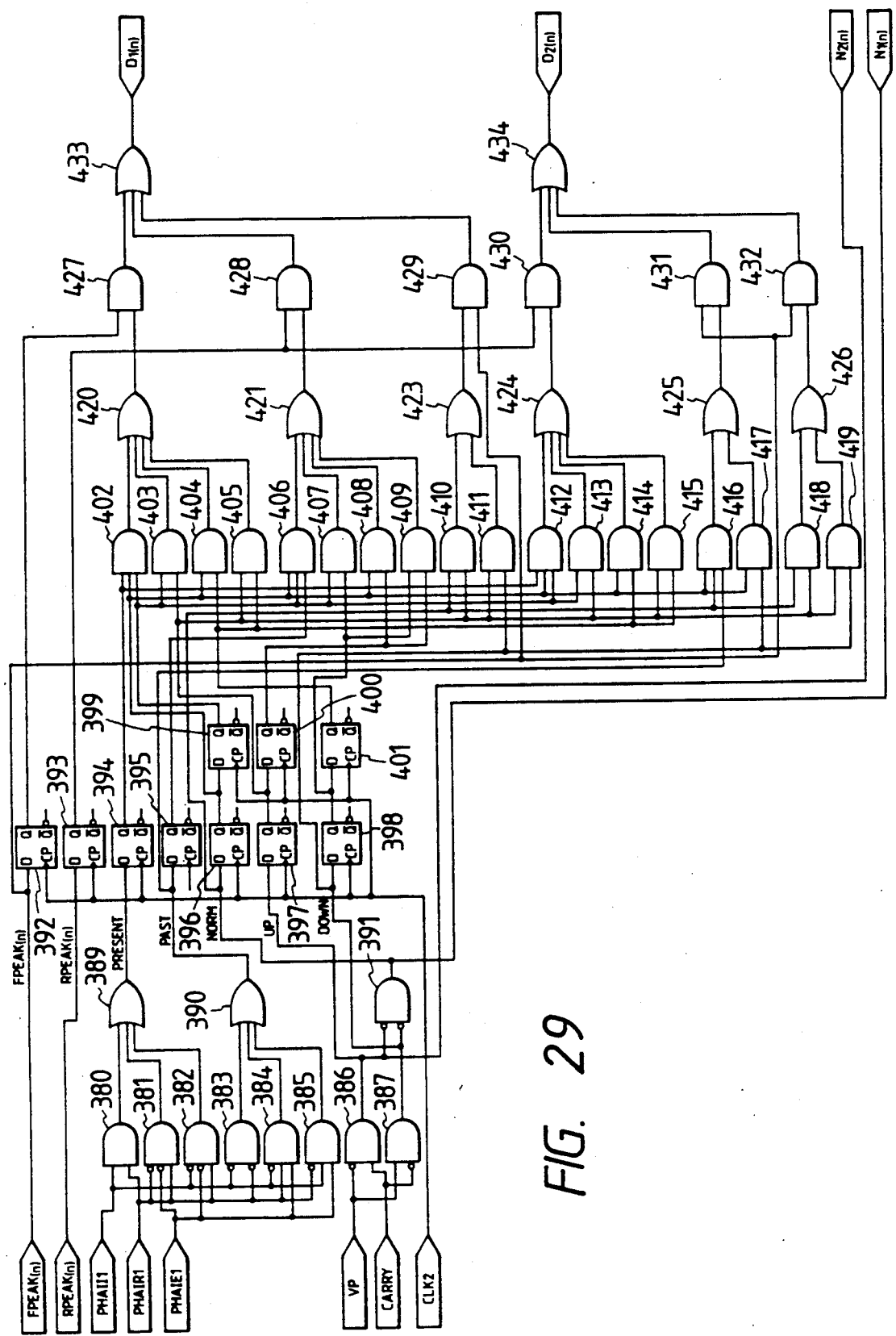
FIG. 29 is a detailed circuit diagram of a data determiner circuit in the embodiment of FIG. 22.

FIG. 29 is a circuit diagram of the data determiner 17 of this embodiment, which implements processing in accordance with equations (14) above, to obtain D1(n) and D2(n).

With the second embodiment, determination time point number indication data and code position indication data for each of sucessive pairs of sampling periods of the input signal $S_i$ are produced directly by the data determiner circuit 17, so that it is not necessary for the rate converter circuit 13 itself to derive such data (as DD1(n), DD2(n)) as is done with the first version of the rate converter circuit 13 of the first embodiment, to produce an Rclock output having a period which is $(\frac{8}{5})T_w$. Thus, the rate converter circuit 13 can derive the Rclock reproduced clock signal and Syncdata detected data signal, using the processing clock signals CLK$_{3-1}$, CLK$_{3-2}$ and CLK$_{3-3}$ shown in FIG. 11, based on the following equations:

$$\text{Syncdata} = D1(m)\cdot D2(m)\cdot CLK_{3-3} + D1(m)\cdot D2(m)\cdot CLK_{3-2} + D(m)\cdot D2(m)\cdot CLK_{3-1}$$

$$\text{Rclock} = N1(m)\cdot N2(m)\cdot CLK_{3-2} + N2(m)\cdot CLK_{3-2} + CLK_{3-1} \quad (15)$$

Alternatively, it would be possible to generate the Rclock and Syncdata outputs with a period of $(4/5)T_w$ for the Rclock pulses, in basically the same way as described hereinabove for the first embodiment.

Figure 30:
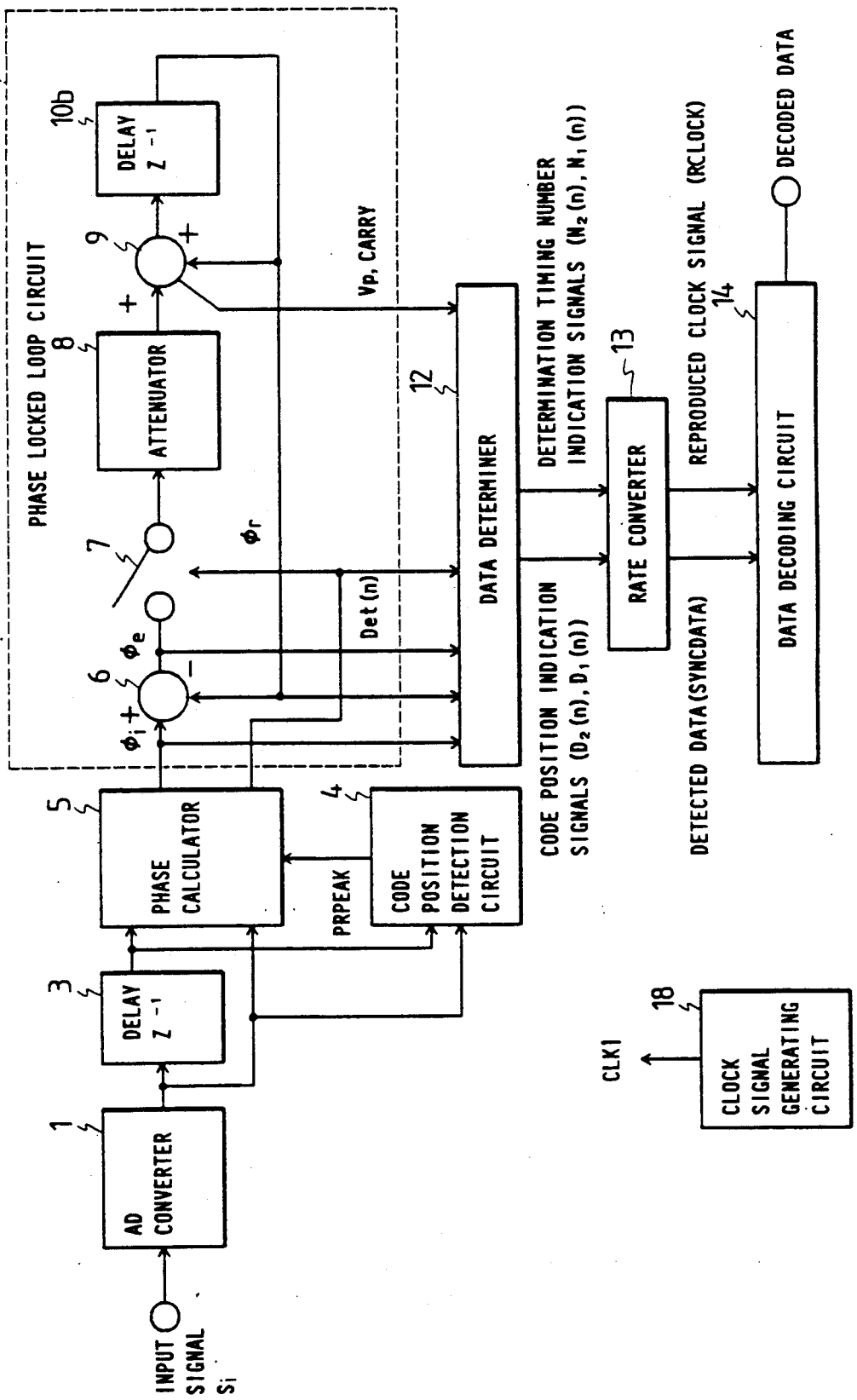
FIG. 30 is a block diagram showing the general configuration of a third embodiment of a data demodulation apparatus according to the present invention, for demodulation of a (2, 7) RLLC NRZI input signal.

The above embodiments have been described for the case of a (2, 7) RLLC NRZ input signal S$_i$. However the invention is equally applicable to a NRZI input signal. FIG. 30 shows the general configuration of a third embodiment of a data demodulation apparatus according to the present invention, for demodulating a (2, 7) RLLC NRZI signal. FIG. 31 is a timing diagram for illustrating the relationships between a (2, 7) RLLC NRZ signal used for recording, shown in FIG. 31(a), a resultant playback signal obtained from the signal of FIG. 31(a), shown in FIG. 31(b), a (2, 7) RLLC NRZI signal used for recording, shown in FIG. 31(c), a resultant playback signal obtained from the signal of FIG. 31(c), shown in FIG. 31(d), and the data sequence that is expressed in each case, in FIG. 31(e). It can be understood that in the case of a (2, 7) RLLC NRZI signal, each zero-crossing point corresponds to the occurrence of a "1" code bit, i.e. a code position as defined hereinabove. Thus, a code position detection circuit 18 of this third embodiment generates a signal Det(n) which goes to the "1" level following the occurrence of a code position within a specific sampling period of the input signal S$_i$. It is therefore unnecessary for the data determiner 20 of this embodiment to define which of two possible sampling periods contains a code position occurrence, as is necessary with the first two embodiments. Thus, the operation of this embodiment is substantially identical to that of the first embodiment, but is simpler, and further description will be omitted.

Although the present invention has been described in the above with application to demodulation of (2, 7) RLLC NRZ and (2, 7) RLLC NRZI input signals, for simplicity of description, the invention is of course equally applicable to NRZ or NRZI input signals which have been encoded by methods other than (2, 7) RLLC. It is only necessary that a suitable code position detection circuit be provided which will indicate each occurrence of a "1" bit in the input signal S$_i$, and a phase calculator circuit which will produce an input phase value corresponding to each such code position.

It can be understood from the above that the present invention enables a data demodulation apparatus to operate, utilizing analog/digital conversion of an input digital data signal, with a sampling period for the A/D conversion that is identical to the bit separation T$_w$ of the input signal S$_i$, rather than with a sampling period that is at least twice the bit separation, such as has been necessary in the prior art. It can further be understood that the invention can be configured such as to enable all circuits of the apparatus other than the A/D converter to operate with a processing clock period which is even greater than the bit separation of the input signal S$_i$, e.g. equal to twice the bit separation. The invention will therefore by highly advantageous with regard to the design and manufacture of such a data demodulation apparatus for demodulation of a digital data signal having a high bit rate.

What is claimed is:

1. A data demodulation apparatus for demodulating a bi-level pulse code modulation input signal, comprising:

means (18) for generating a processing clock signal (CLK1) having a fixed period which is identical to a bit separation of said input signal;

analog/digital conversion means (1) controlled by the processing clock signal for periodically sampling said input signal at successive sampling time points separated by sampling periods, to produce successive digital sample values, said sampling periods being respectively identical to periods of said processing clock signal;

means (3, 4) responsive to said sample values for detecting each occurrence of a code position of the input signal within a sampling period and for generating a detection signal indicative of such detection;

means (3, 5) functioning upon each detection of a code position to derive an input phase value of a regenerated clock phase, the input phase value being established with respect to the code position as a reference phase value;

means (11, 12) responsive to said detection signal and successive ones of said input phase values for deriving a number of determination time points, said determination time points representing respective bit positions of said input signal which have occurred during a specific one of said sampling periods and for producing a first output data signal (N1(n), N2(n)), as determination time point indication data representing said determination time points, and further for detecting the presence of any code position during said specific sampling period and for determining a time relationship of said code position to said determination time points, and for producing a second output data signal (D1(n), D2(n)) as code position indication data indicating said presence of a code position and indicating said time relationship.

2. A data demodulation apparatus according to claim 1, and further comprising rate converter circuit means (13) responsive to said first output data signal for generating a reproduced clock phase signal (Rclock) comprising during each of sets of N successive ones of said processing clock periods, where N is an integer, a number of periodically generated reproduced clock pulses that is indicated by said determination time point number indication data of said set of processing clock periods in combination, and responsive to said second output data signal for generating a detected data signal (Syncdata) comprising during said each set of processing clock periods a number of code bits that is indicated by said code position indication data of said set of processing clock periods in combination, and for synchronizing said code bits with specific ones of said reproduced clock pulses in accordance with said code position indication data of said set.

3. A data demodulation apparatus according to claim 1, in which the input signal is a signal that has been produced by non-return-to-zero-inverted modulation from a digital signal that has been encoded in (2,7) run length limited code, and in which said reproduced clock pulses are generated with a period which is equal to N/(N+1) times said processing clock period.

4. A data demodulation apparatus according to claim 1, in which the processing clock time points have a period which is twice said sampling period, and further comprising buffer gate means responsive to said code detection signal and said sample values for producing range indication signals (Fpeak, Rpeak) for selectively indicating whether a detected code position corresponds to a first or to a second one of two successively occurring portions of the processing clock period, and in which said data determiner means further utilizes said range indication signals in deriving said determination time point number indication data and said code position indication data.

5. A data demodulation apparatus for demodulating a bi-level pulse code modulation input signal, comprising:

analog/digital converter means for periodically sampling said input signal at sampling time points having a fixed sampling period to produce successive sample values, said sampling period being substantially identical to a value of bit separation of said input signal;

code position detection means responsive to said sample values for detecting code positions in said input signal and for generating a code detection signal in response to each code position detection;

phase calculation means responsive to said sample values for producing, for each detected code position in said input signal, a corresponding input phase value representing a phase difference between said code position and said sampling time points;

phase locked loop circuit means for producing reproduced clock phase values at respective time points of a processing clock signal which are synchronized with said sampling time points, and responsive to said input phase values for deriving corresponding phase error values to compensate said reproduced clock phase values; and data determiner means coupled to receive said input phase, reproduced clock phase, phase error, and code detection signal, for deriving successive determination time points corresponding to respective bit positions in said input signal and for executing computation to derive, for each period of said processing clock signal, determination time point number indication data indicating a number of determination time points corresponding to that period, said determination time points representing respective bit positions of said input signal, and code position indication data indicating any occurrence of a code position within that period and specifiying a determination time point to which said code position is assigned.

6. A data demodulation apparatus according to claim 5, in which said processing clock time points are identical to said sampling time points.

7. A data demodulation apparatus according to claim 5, further comprising rate conversion means for combining said determination time point number indication data and said code position indication data of N successive processing clock periods to obtain expanded period determination time point indication data and expanded period code position indication data respectively for an expanded period of duration equal to N processing clock periods where N is an integer, and for producing during said expanded period as a recovered clock signal a number of clock signal bits that is specified by said expanded period determination time point indication data and for producing as a recovered data signal a number of code bits that is specified by said expanded period code position indication data, and for synchronizing said code bits with specific ones of said recovered clock signal bits as specified by said expanded period code position indication data, and said bit separation of said recovered clock signal and recovered data signal being equal to N/(N+1) times said sampling period.

8. A data demodulation apparatus according to claim 5, in which said input signal is a signal that has been produced by non-return-to-zero modulation from a digital signal that has been encoded in said (2, 7) run length limited code, and in which said code position detection means functions by detecting peak values of said input signal as code positions.

9. A data demodulation apparatus according to claim 8, in which said code position detection means comprises means for periodically executing a predetermined computation operation on three successive sample values, for detecting when a peak value has occurred within a range of two successive sampling periods extending from a first one to a last one of said three successive sample values, and means for producing a code position detection signal when a peak value is detected as occurring within said range, in which said phase calculation means executes a predetermined computation operation on said three successive sample values to derive an input phase value of any code position that has occurred within said range of two successive sampling periods, and in which said data determiner means functions to assign any code position that has been detected within that range, to an appropriate one of said two successive sampling periods.

10. A data demodulation apparatus according to claim 5, in which said input signal is a signal that has been produced by non-return-to-zero-inverted modulation using a digital signal that has been encoded in said (2,7) run length limited code and in which said code position detection means functions by detecting zero-crossing conditions of said input signal as code positions.

* * * * *